(12) United States Patent
Tsukuda et al.

(10) Patent No.: US 6,700,862 B2
(45) Date of Patent: Mar. 2, 2004

(54) OPTICAL DISC AND MANUFACTURING METHOD FOR THE SAME

(75) Inventors: Masahiko Tsukuda, Moriguchi (JP); Shinya Abe, Kadoma (JP); Shuji Sato, Neyagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 290 days.

(21) Appl. No.: 09/967,935

(22) Filed: Oct. 2, 2001

(65) Prior Publication Data

US 2002/0060979 A1 May 23, 2002

(30) Foreign Application Priority Data

Oct. 3, 2000 (JP) ........................................ 2000-303345
Oct. 3, 2000 (JP) ........................................ 2000-303346

(51) Int. Cl.⁷ ................................................ G11B 7/24
(52) U.S. Cl. ................................ 369/275.4; 369/275.1; 430/270.13; 428/64.4
(58) Field of Search ........................... 369/275.4, 275.1, 369/94, 277, 278, 279, 280, 281, 286, 275.2, 13.55; 428/64.4, 64.1; 430/270.13, 320, 321

(56) References Cited

U.S. PATENT DOCUMENTS 5,381,401 A * 1/1995 Best et al. ............... 369/275.1
5,581,539 A * 12/1996 Horie et al. ............. 369/275.4
5,745,475 A * 4/1998 Ohno et al. .............. 369/275.4
5,881,032 A * 3/1999 Ito et al. .................... 369/30.1
6,456,584 B1 * 9/2002 Nagata et al. ........... 369/275.2
6,603,733 B2 * 8/2003 Tsukagoshi et al. ........ 369/280
6,611,491 B2 * 8/2003 Nishiuchi et al. ........ 369/275.1

FOREIGN PATENT DOCUMENTS

JP       5-182203 A   * 7/1993   ............ 369/275.4

* cited by examiner

Primary Examiner—Tan Dinh
(74) Attorney, Agent, or Firm—Wenderoth, Lind & Ponack, L.L.P.

(57) ABSTRACT

The width and/or depth of guide grooves on the disc substrate surface are changed in each data recording layer and the guide groove depth of the recording film layer is appropriately shaped in each data recording layer to provide a high density, high recording capacity optical disc. The optical disc has plural substrate layers each having plural guide grooves; plural data recording layers laminated on the substrate layers, each of the plural data recording layers having a recording film for recording data over the guide grooves; and an intermediate layer between the plural data recording layers. The guide groove width is different on each substrate layer. The guide grooves of the data recording layers formed according to the guide grooves of the substrate layer have the same pitch in each data recording layer.

11 Claims, 14 Drawing Sheets

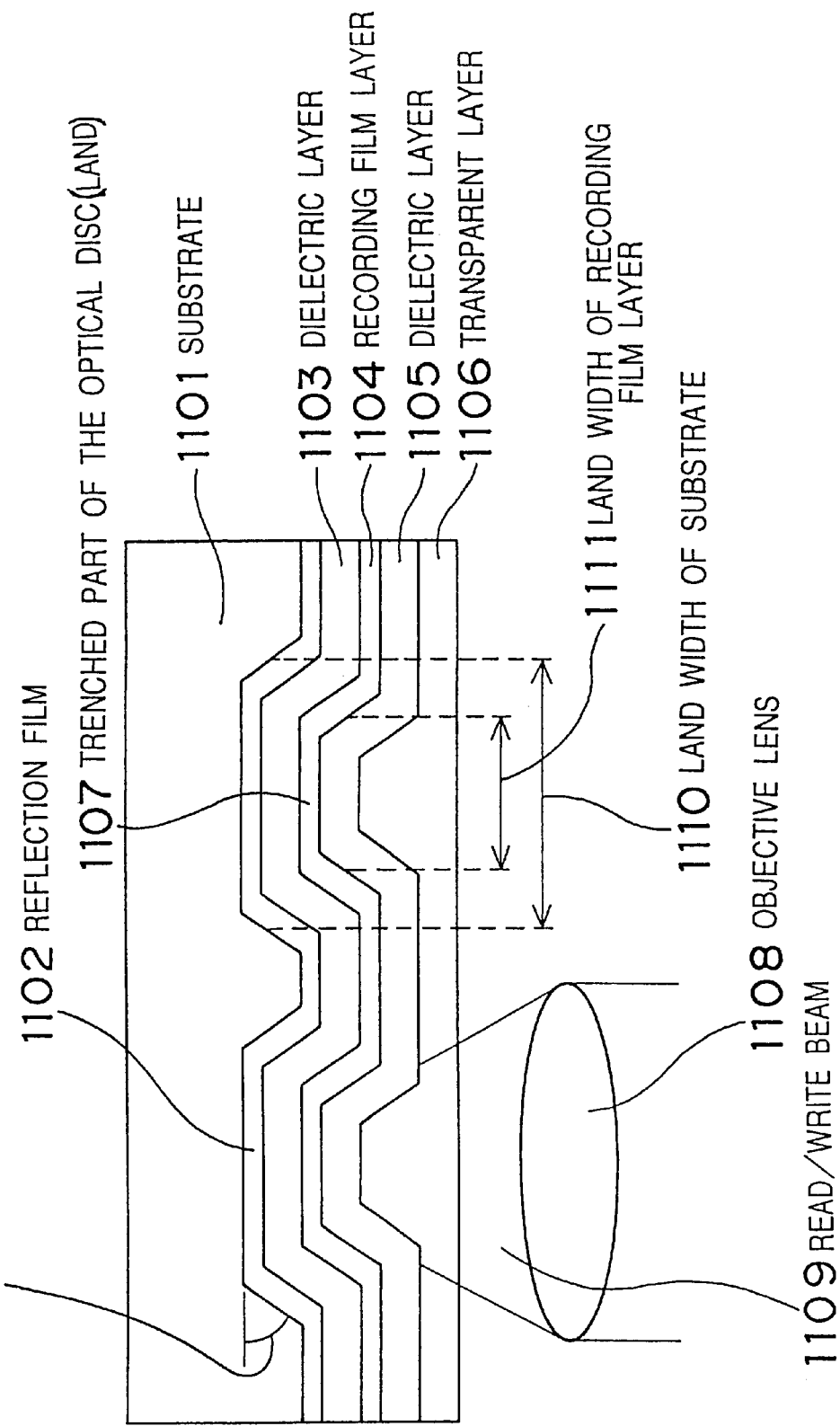

OPTICAL DISC AND MANUFACTURING METHOD FOR THE SAME

BACKGROUND OF THE INVENTION

1. Field of the Invention

The present invention relates generally to an optical storage medium such as an optical disc and to a manufacturing method for the same. More specifically, this invention relates to the structure of a high density, multiple layer optical storage medium having plural data recording layers with a guide groove, and to a manufacturing method for this optical storage medium.

2. Description of Related Art

Compact Discs (CDs) are now widely used and optical discs have earned an important role as a recording and storage medium. While conventional CD media is read-only, CD-R (recordable) and CD-RW (rewritable) media can also be used by the end user for recording and reproducing information. Subsequent research continues to develop other types of even higher density optical discs.

Optical discs have a guide groove consisting of a land and groove pattern for signal recording formed in the data recording layer. When seen from the side emitting the laser beam for recording or reproducing data, the side that is recessed in a concave shape away from the laser beam source is called the land, and the side that protrudes toward the laser beam source is called the groove. Recording capacity is determined in part by the pitch of the recordable and reproducible guide grooves (the track pitch). DVD-RAM media, for example, uses a land and groove recording method to record data to both lands and grooves. The track pitch is 0.74 $\mu$m in DVD-RAM media with a 2.6 GB recording capacity, and is 0.615 $\mu$m with a 4.7 GB recording capacity.

Optical disc recording density can be increased by increasing recording density in the recording layer and by increasing the number of recording layers. For example, Digital Versatile Disc (DVD) media, which has been standardized and are now readily available, is a read-only optical disc media with two data recording layers formed so that both data recording layers can be read from the same side of the disc. An optical disc having two data recording layers that can be recorded by an end user has also been developed and reported in the literature for use as recordable and readable DVD media.

The structure of a recordable and readable optical disc is described next with reference to FIG. 2. The recordable and readable optical disc shown in FIG. 2 has two data recording layers. Both data recording layers are made using a phase change recording material, a type of material whose optical characteristics can be changed between amorphous and crystalline states. Data is recorded to the data recording layers by recording a pattern of marks. More specifically, a first data recording layer 206 is formed in a first transparent layer 201 having a guide groove. The first data recording layer 206 consists of a recording film 203 made from a phase change material disposed between substantially transparent dielectric film 202 and substantially transparent dielectric film 204, and a translucent metal reflection film 205.

The second data recording layer 212 is formed in a second transparent layer 207 having a guide groove. This second data recording layer 212 consists of a metal reflection film 211 and a recording film 209 disposed between substantially transparent dielectric film 210 and substantially transparent dielectric film 208.

The first data recording layer 206 and second data recording layer 212 are bonded together separated a specific distance by an intervening substantially transparent adhesive layer 213. These data recording layers are formed following the guide groove patterns on the substrate surfaces, the recording film of each data recording layer is also formed following the guide groove pattern. The recording films therefore also have a guide groove.

The recording marks are formed in the recording film of the data recording layer, and the recording and reproducing characteristics are therefore more easily affected by the guide groove pattern on the recording film surface than the guide groove pattern on the substrate surface. In a conventional two-layer disc the guide groove width is wide compared to the thickness of the data recording layer, and two-layer optical discs are therefore produced according to the shape of the guide grooves formed on the substrate surface.

In order to further increase the recording density of the data recording layers, the guide groove pitch must be reduced and the guide grooves must be made accordingly narrower. However, if the ratio of the guide groove width to the data recording layer thickness (particularly the thickness of the film between the substrate surface and the recording film) is small, the width of the guide grooves appearing on the recording film surface when the recording film is formed will be small relative to the width of the guide grooves on the substrate surface. A difference also develops between the film thickness in the substrate guide grooves and the film formed between the guide grooves, which causes guide groove depth to change in addition to the guide groove width.

Because the configuration or thickness of each data recording layer differs in a multilayer optical disc, the desired performance cannot be achieved if the guide groove width and depth are the same in each layer even if the recording density is the same in each data recording layer.

SUMMARY OF THE INVENTION

An object of the present invention is therefore to provide a high storage capacity, high density optical disc by changing the width and/or depth of the guide grooves on the substrate surface in each data recording layer, and forming the depth of the guide grooves on the recording film surface to a desired shape in each data recording layer.

To achieve this object, an optical disc according to the present invention has plural substrate layers each having plural guide grooves; plural data recording layers laminated on the substrate layers, each of the plural data recording layers having a recording film for recording data over the guide grooves; and an intermediate layer between the plural data recording layers. The guide groove width is different on each substrate layer. The guide grooves of the data recording layers formed according to the guide grooves of the substrate layer have the same pitch in each data recording layer.

Further preferably, light for recording and reproducing data is emitted to one side of the optical disc, and the groove width of the guide grooves widens with the depth to the substrate layer from the surface to which the light is emitted.

An optical disc manufacturing method according to the present invention for manufacturing an optical disc having a plurality of substrate layers each having a recording film for recording data has steps for: supplying a plurality of substrates; coating each of the plural substrates with a photosensitive material; recording a pattern containing guide grooves in each of the plural substrates by changing guide groove recording beam density so that the recorded guide groove width is different in each of the plural substrates; developing each of the plural substrates to produce a plurality of master plates having the recorded pattern; duplicating a plurality of stampers based on each of the plural master plates, and producing a plurality of substrate layers based on the stampers; laminating a data recording layer having a recording film on each of the plural substrate layers; and bonding the plural data recording layers together by way of an intervening intermediate layer.

Preferably, an optical disc according to the present invention is recordable and reproducible using 390 nm to 450 nm wavelength light emitted from a read/write head having an objective lens with a numerical aperture of 0.7 or greater. This optical disc has a substrate layer having guide grooves at a track pitch of 0.36 µm or less; a data recording layer containing a recording film laminated to the substrate layer for recording data to a guide groove of the recording film formed according to a guide groove of the substrate layer; and a transparent layer that is substantially transparent laminated to a thickness of 0.3 mm or less to the data recording layer for passing light emitted to the data recording layer. The groove width of the guide groove formed on the substrate layer is wider than the groove width of the guide groove of the recording film and within 50% to 80% of the track pitch.

It is possible with a multilayer optical disc having plural data recording layers with guide grooves according to the present invention to optimize the guide grooves in the data recording layers to substantially the same the width or depth by changing the width or depth of the guide grooves at the substrate surface for each data recording layer. This is achieved by changing the guide groove width or depth in the master that is the basis for the guide groove pattern on the substrate surface. Good playback signal quality can therefore be achieved from each data recording layer when a signal is recorded and then reproduced.

The groove width of the guide grooves formed in the substrate layer is greater than the groove width of guide grooves in the recording film and is from 50% to 80% of the track pitch in an optical disc according to the present invention. This achieves a high density optical disc with a large storage capacity and excellent recording and reproducing characteristics enabling information to be recorded and reproduced. This optical disc is achieved by adjusting the groove edge angle of the guide grooves to a desirable angle.

Furthermore, by using the narrowing of the groove width resulting with film formation as a result of building up a thin film layer including a recording film layer in the trench part of the land and groove pattern in both single-sided, single layer optical discs and single-sided two-layer optical discs, the present invention can also achieve a single-sided two-layer optical disc using currently developed laser beam recorders and molding methods.

Other objects and attainments together with a fuller understanding of the invention will become apparent and appreciated by referring to the following description and claims taken in conjunction with the accompanying drawings.

BRIEF DESCRIPTION OF THE DRAWINGS

First to fifth embodiments of the present invention will now be described hereinafter by way of example and with reference to the appended drawings, in which:

FIG. 11 is a schematic view showing the structure of an optical disc according to a third embodiment of the present invention;

DESCRIPTION OF THE PREFERRED EMBODIMENTS

The preferred embodiments of the present invention are described below with reference to the accompanying figures.

Embodiment 1

An optical disc and an optical disc manufacturing method according to the present invention are described next below.

Figure 1:
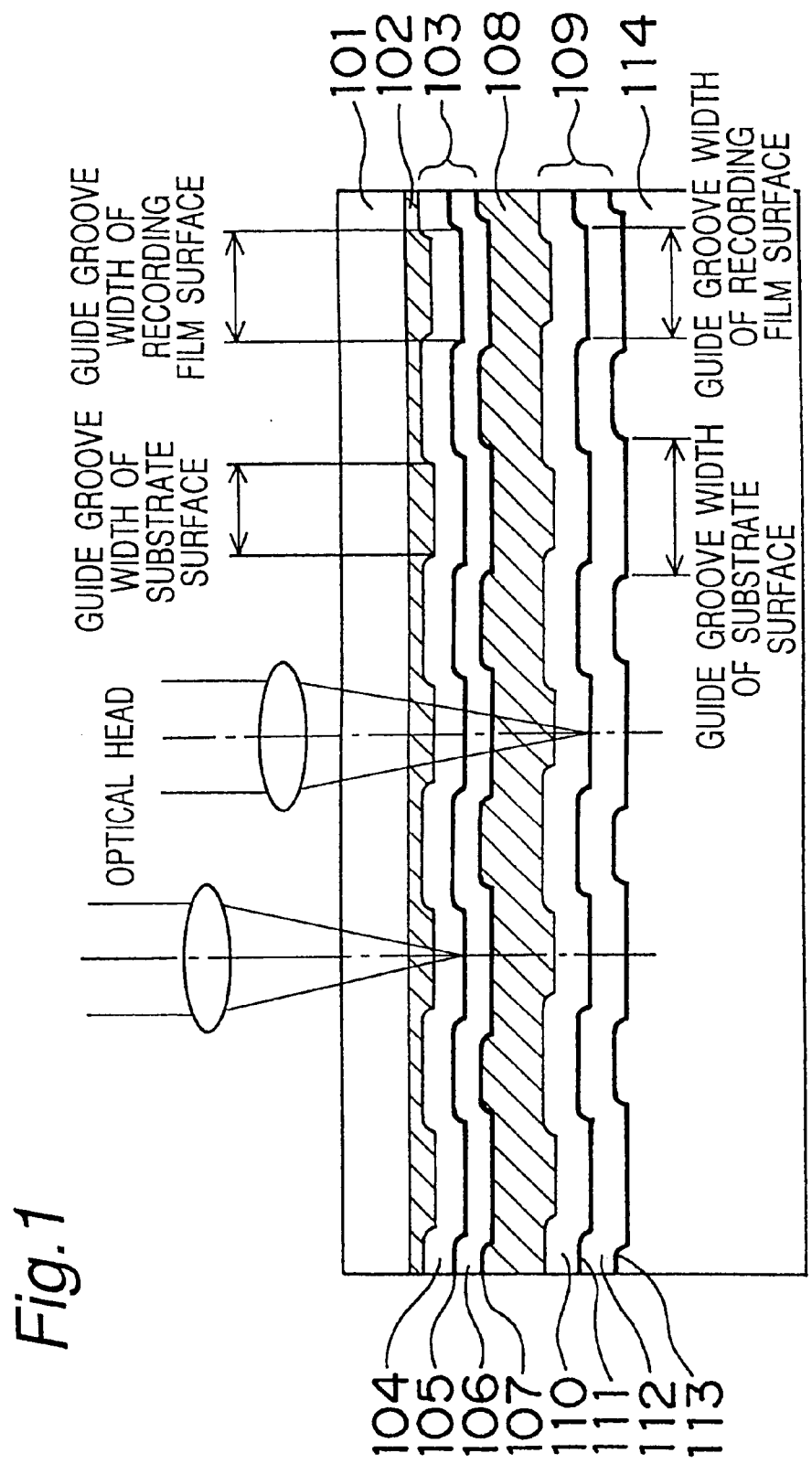
FIG. 1 is a sectional view of the structure of a multilayer optical disc according to a first embodiment of the present invention.
Figure 2:
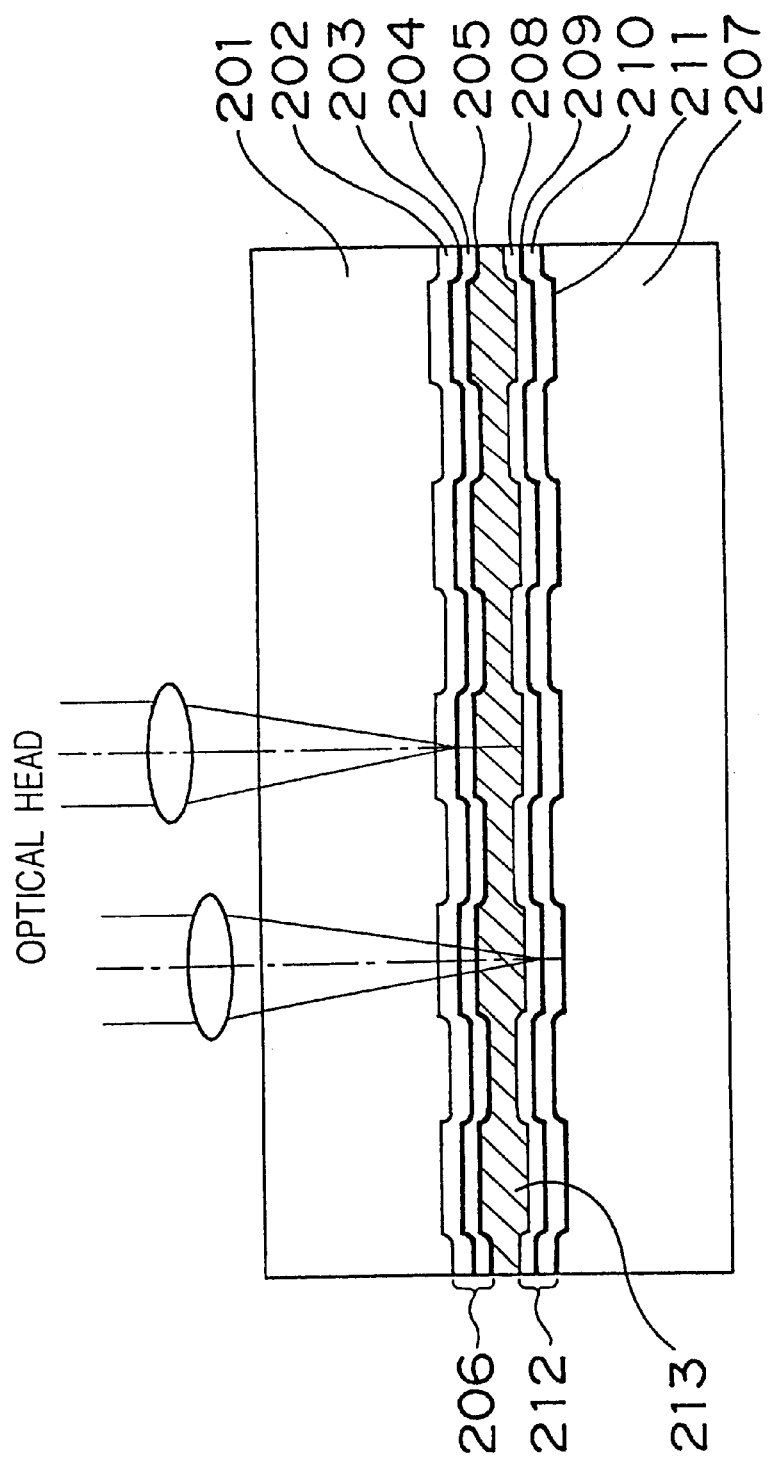
FIG. 2 is a sectional view of the structure of a prior art optical disc.

FIG. 1 is a sectional view along the radius of a multilayer optical disc according to a first embodiment of the invention. As shown in FIG. 1, a multilayer optical disc according to a first embodiment of the invention has laminated together an approximately 80 µm thick polycarbonate sheet 101, an approximately 10 µm thick first UV-cure resin layer 102 to which the guide groove pattern is transferred, a semitransparent first data recording layer 103 in which marks are formed to record data, an approximately 20 µm to 40 µm thick second UV-cure resin layer 108, a second data recording layer 109 in which marks are formed to record data, and an approximately 1.1 mm thick polycarbonate substrate 114 to which the guide groove pattern is transferred.

The second UV-cure resin layer 108 is an intervening layer separating the two data recording layers, that is, first data recording layer 103 and second data recording layer 109.

The first data recording layer 103 is a lamination of recording film 105 made from a phase change recording material of primarily GeTeSb, dielectric films 104 and 106 of primarily ZnS, and translucent reflection film 107, a metal alloy of primarily Ag. The recording film 105 is disposed between dielectric films 104 and 106. As shown in the figure, the laser beam from the optical head is emitted from the first data recording layer 103 side of middle layer 108. Reading data from the second data recording layer 109 and writing data to the second data recording layer 109 must be accomplished through the first data recording layer 103. The transmittance of the first data recording layer 103 is therefore set to approximately 50%.

The second data recording layer 109 is similarly a lamination of recording film 111 made from a phase change recording material of primarily GeTeSb, dielectric films 110 and 112 of primarily ZnS, and a metal alloy reflection film 113. The recording film 111 is disposed between the dielectric films 110 and 112.

The base layer on which the first data recording layer 103 is formed is the first UV setting resin layer 102 in which the guide groove pattern is formed. The base layer on which the second data recording layer 109 is formed is the other polycarbonate substrate 114 in which the guide groove pattern is also formed.

As described above, data is recorded by emitting a laser beam from the polycarbonate sheet 101 side of the media to form marks in the guide groove part of each recording film. Data is likewise reproduced by emitting a laser beam from the polycarbonate sheet 101 side of the disc and reading the light reflected from the marks formed in the guide groove part of the recording films.

In a multilayer optical disc according to this first embodiment, the recessed part as seen from the side to which the laser beam is incident (i.e. the polycarbonate sheet 101 side) is the guide groove in both first data recording layer 103 and second data recording layer 109. If the part protruding toward the side to which the laser beam is incident is defined as the groove and the part recessed away from the incidence surface as the land according to the DVD-RAM standard, the multilayer optical disc according to this first embodiment records and reproduces data from the land in both data recording layers. It will be noted that the guide groove is not limited to the land, and can be the groove.

The multilayer optical disc of this first embodiment is manufactured by adjusting the guide groove width of the first UV-cure resin layer 102 and polycarbonate substrate 114 that are the bases for the first data recording layer 103 and second data recording layer 109. The guide grooves (lands) of the recording film 105 formed in the first data recording layer 103 and the recording film 111 formed in the second data recording layer 109 are formed substantially identically to a desired width. The guide groove pitch is substantially equal in each of the layers.

Good reproduction signal quality, particularly the jitter and carrier noise ratio, are important for data recording and reproducing. Jitter is the difference between the standard (actual) mark length and the mark length detected by the reflected light normalized by a width called the window when a laser beam irradiates a recording mark recorded with a discrete length. The carrier-noise ratio is the ratio of the amplitude of the reproduction signal frequency to the amplitude of noise at that frequency when a recording mark is reproduced.

The thicknesses of the films forming the first data recording layer and second data recording layer in this multilayer optical disc are shown in Table 1.

TABLE 1

|  | 1st dielectric film | Recording film | 2nd dielectric film | Metal reflection layer |
|---|---|---|---|---|
| 1st data recording layer | 79 nm | 6 nm | 53 nm | 20 nm |
| 2nd data recording layer | 113 nm | 20 nm | 45 nm | 80 nm |

A multilayer optical disc in which the guide groove widths on the substrate surface are 0.16 μm, 0.26 μm, and 0.4 μm, guide groove pitch is twice the groove width, and groove depth is 16 nm is considered here. Jitter when a single frequency signal producing 0.185 μm long recording marks on the data recording layer is recorded to each data recording layer of this multilayer optical disc using a 405 nm wavelength laser and an optical head with a 0.85 numerical aperture is shown in Table 2, and the carrier noise ratio is in Table 3. Note that groove width as used here is the half value width of the groove.

TABLE 2

|  | Guide groove width on substrate surface | | |
|---|---|---|---|
|  | 0.16 μm | 0.26 μm | 0.4 μm |
| 1st data recording layer | 13% | 10% | 7% |
| 2nd data recording layer | 14% | 12% | 7% |

TABLE 3

|  | Guide groove width on substrate surface | | |
|---|---|---|---|
|  | 0.16 μm | 0.26 μm | 0.4 μm |
| 1st data recording layer | 46 dB | 50 dB | 56 dB |
| 2nd data recording layer | 45 dB | 48 dB | 56 dB |

Figure 7:
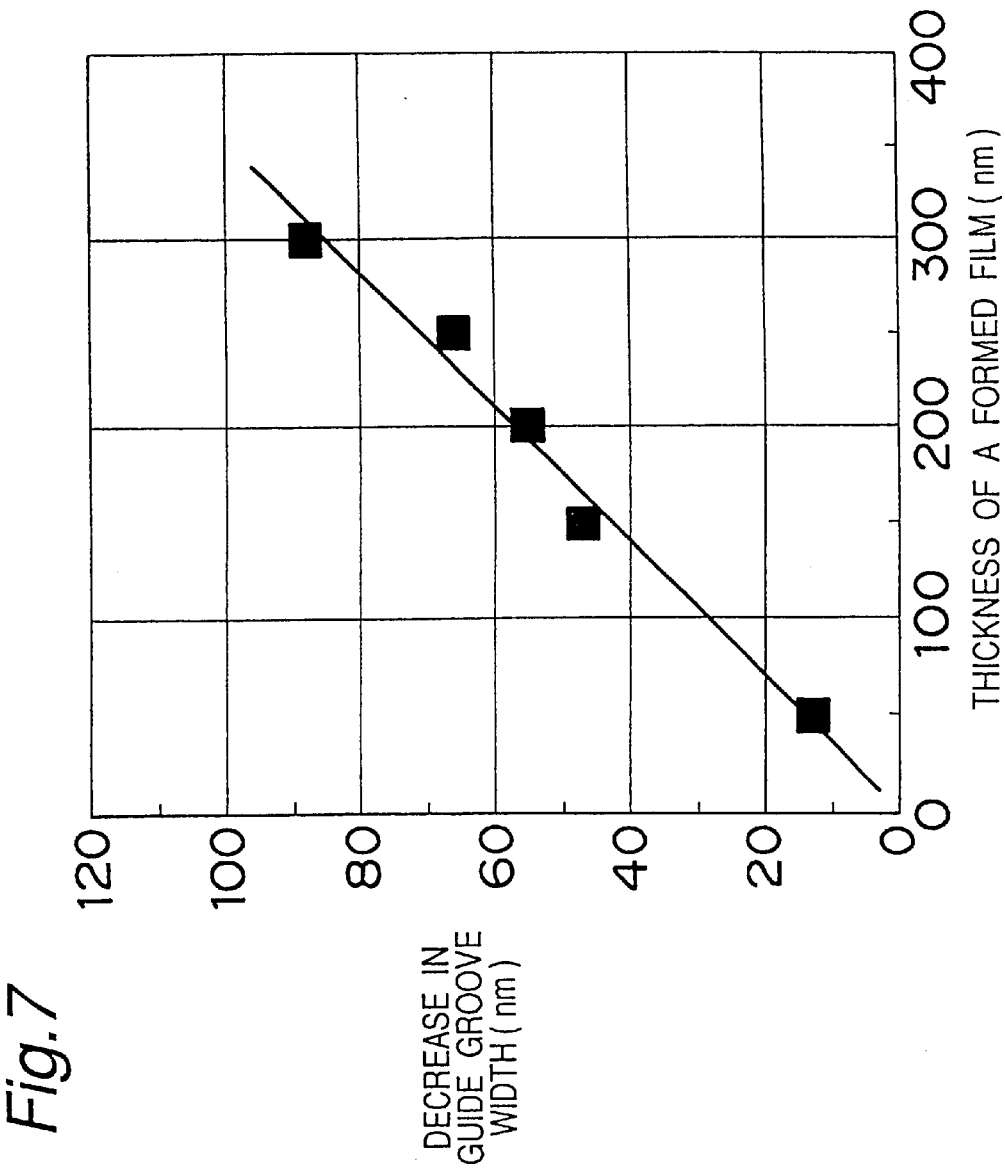
FIG. 7 is a graph of the relationship between film thickness and groove width reduction.

When the films are formed on the substrate, the width of the groove in the film narrows as film formation continues due to the accumulated thickness of the films. FIG. 7 shows the relationship between the decrease in guide groove width and the thickness of the formed film. At the film thickness shown in Table 1, the guide groove width narrows at the recording film surface in each data recording layer by the amount shown in Table 4.

TABLE 4

|  | Decrease in width of guide groove |
|---|---|
| 1st data recording layer | 22 nm |
| 2nd data recording layer | 34 nm |

The results of jitter and carrier noise ratio measurements taken with the guide groove pitch held constant and the width of guide grooves on the substrate surface increased an amount equal to the width decrease shown in Table 4 are shown in Tables 5 and 6.

TABLE 5

| | Guide groove width on substrate surface | | |
| --- | --- | --- | --- |
| | 0.16 μm | 0.26 μm | 0.4 μm |
| 1st data recording layer | 11% | 10% | 7% |
| 2nd data recording layer | 11% | 10% | 7% |

TABLE 6

| | Guide groove width on substrate surface | | |
| --- | --- | --- | --- |
| | 0.16 μm | 0.26 μm | 0.4 μm |
| 1st data recording layer | 47 dB | 50 dB | 56 dB |
| 2nd data recording layer | 47 dB | 50 dB | 56 dB |

As will be known from Tables 5 and 6, an improvement in reproduction signal quality in terms of jitter and carrier noise ratio is observed when the guide groove width on the substrate surface is corrected, and substantially the same jitter and carrier noise ratio values are achieved on both data recording layers. However, while this improvement is not observed at a 0.4 μm groove width, the effect is observed in the second data recording layer where an approximately 30 nm correction is made and the groove width is 0.26 μm. It will therefore be understood that the multilayer optical disc of this invention is effective with a groove width of approximately 0.3 μm or less.

It will be further noted that depending upon the structure of each data recording layer, even better playback signal characteristics can be achieved by adjusting the guide groove width itself in each signal recording layer rather than only adjusting the difference between the guide groove width on the substrate surface and the guide groove width in the recording film surface.

For example, with the multilayer optical disc shown in FIG. 1, a laser beam irradiates the second data recording layer 109 through the first data recording layer 103 to record or reproduce information. There is, therefore, the chance that the characteristics of the playback signal from the second data recording layer 109 will deteriorate. This is not limited to two layer discs, also occurs with a greater number of layers, and the potential for playback signal degradation increases with layer depth from the side to which the laser beam is incident. On the other hand, playback signal quality as measured by jitter and carrier noise ratio tends to improve as the guide groove width increases. It is therefore desirable in a multilayer optical disc having plural data recording layers to form the guide grooves to the same width on any same recording film surface but increase guide groove width as the depth of the recording layer from the disc surface (referred to below as the recording layer depth) increases. The guide groove width preferably increases gradually with recording layer depth. This achieves even better playback signal quality. Correction for the difference between the guide groove width on the substrate surface and the guide groove width on the recording film surface is appropriately adjusted to achieve the best playback signal characteristics.

Figure 3:
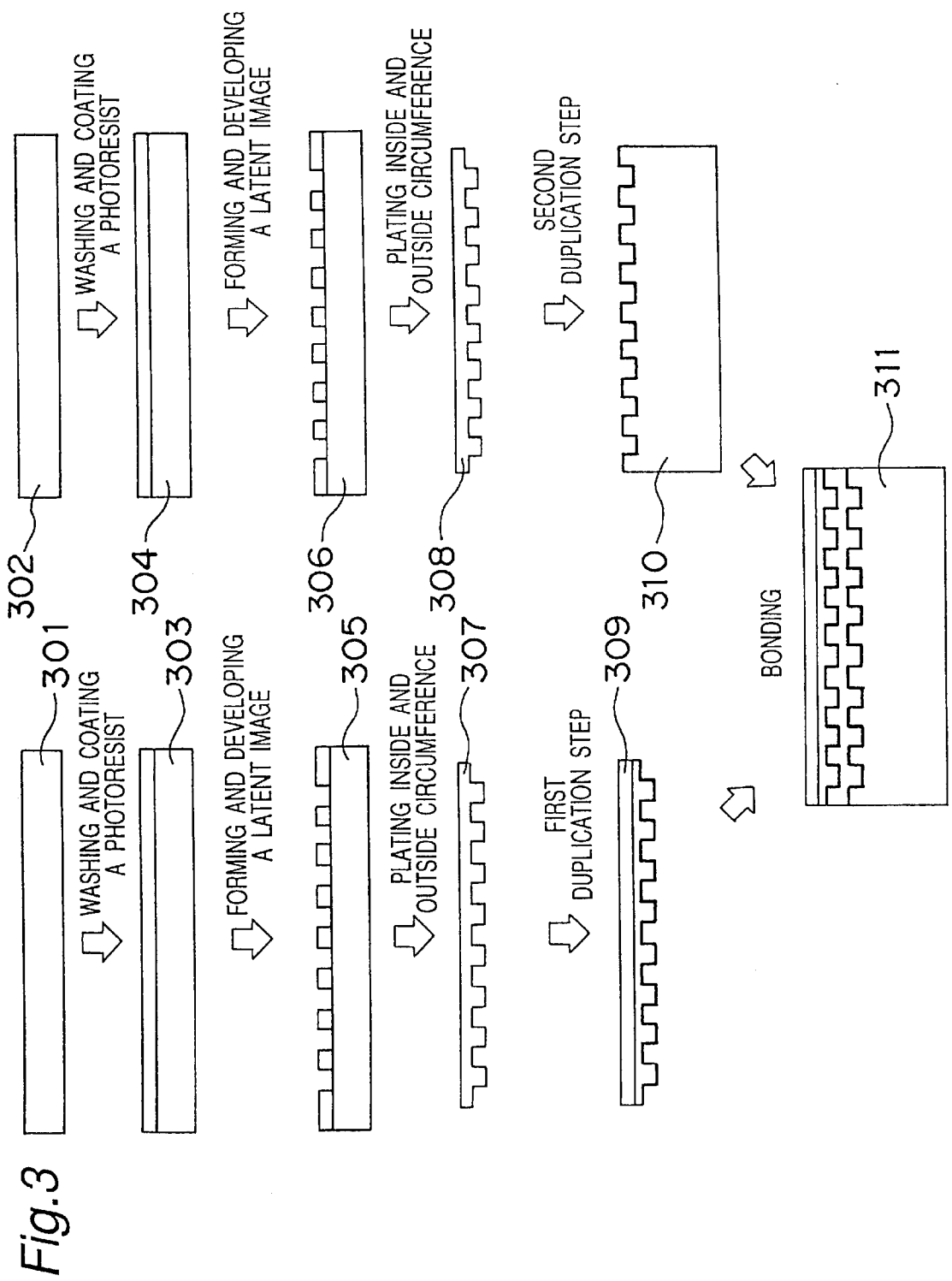
FIG. 3 is a diagram of steps in production of a multilayer optical disc according to a first embodiment of the present invention.

A method for manufacturing a multilayer optical disc according to this first embodiment of the invention is described next with reference to FIG. 3.

A first glass substrate 301 and a second glass substrate 302 are first supplied and washed, then coated with a photosensitive material to form a photoresist, creating a first plate 303 and second plate 304. A latent image of a desired pattern, including the guide groove, is then formed on the masters using a laser beam recorder. The image is then developed to form a first master 305 and second master 306 with the desired pattern (land and groove guide grooves). The manufacturable groove width is determined by the wavelength of the laser used as the light source of the laser beam recorder, and the numerical aperture (NA) of the objective lens used to collimate the laser beam on the photoresist plate.

A Ni thin film is then sputtered onto the masters, used as an electrode for Ni electroforming to an approximately 300 μm film thickness, and removed. After the Ni thin film is removed, and the photoresist is removed and the back side is polished. The masters are then stamped to the desired inside circumference and outside circumference, completing the first stamper 307 and second stamper 308 as molds to which the desired land and groove pattern has been transferred.

Figure 4:
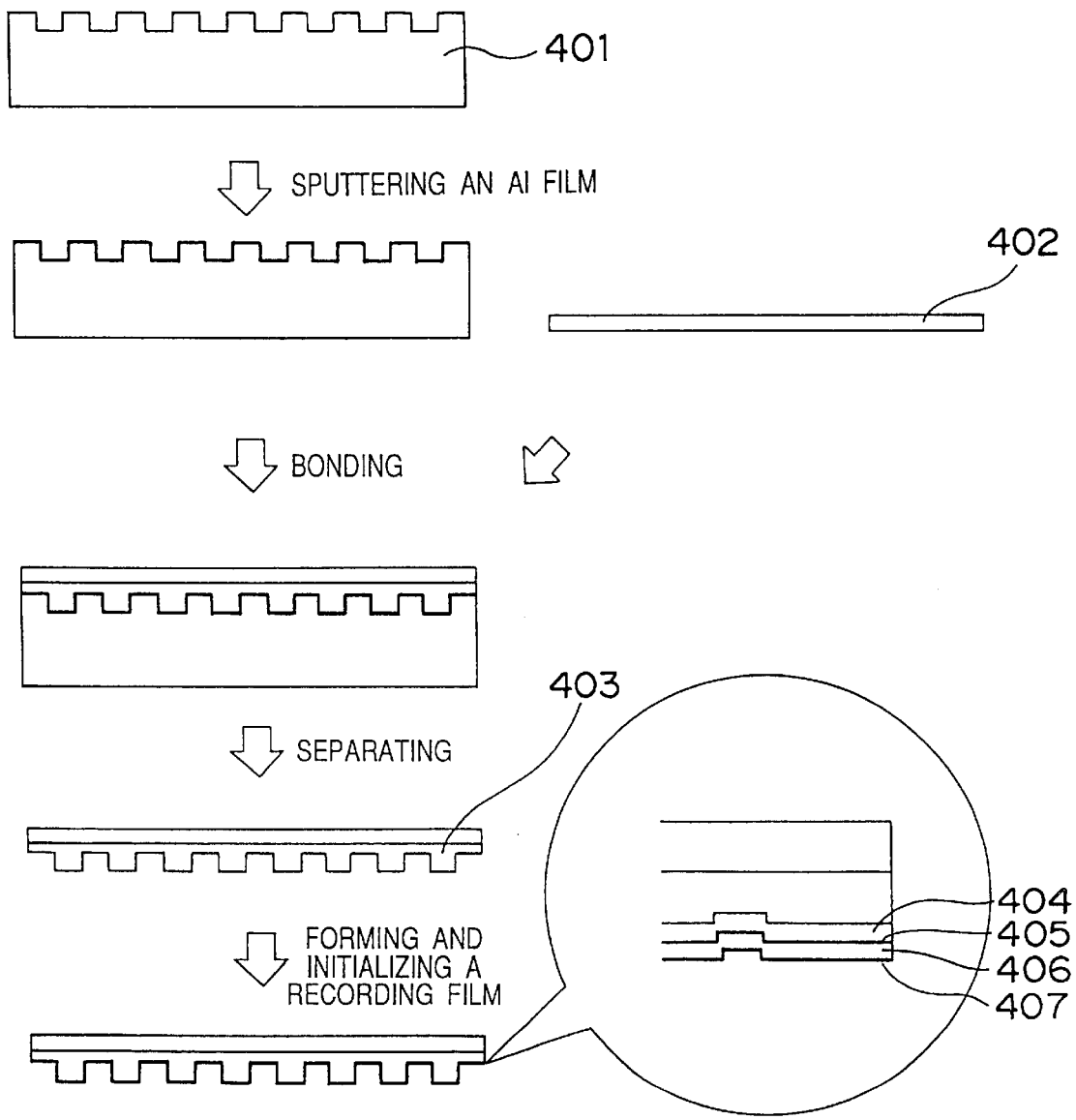
FIG. 4 is a diagram of a first duplication process in the first embodiment of the invention.

A first substrate 309 with a data recording layer is then produced in a first duplication step using the first stamper 307. FIG. 4 shows this first duplication process. First, a polycarbonate substrate master 401 is formed by injection molding based on the first stamper 307. An Al film is then sputtered onto the substrate master 401. An approximately 0.1 mm thick polycarbonate sheet is then stamped to the desired inside and outside circumference dimensions to form a circular sheet 402. A UV setting resin is then sprayed concentrically onto the circular sheet 402 in a donut shape, the substrate master 401 is then stacked with the Al film surface against the circular sheet 402, and the layers are spun to remove any excess UV setting resin. The thickness at this stage is approximately 10 μm. The UV setting resin is then exposed to UV light and set, and the circular sheet 402 and substrate master 401 are separated at the interface between the UV setting resin and Al film, thus forming sheet substrate 403 to which the pattern has been transferred from the first stamper 307.

A first dielectric film 404 of primarily ZnS, a recording film 405 made from a phase change recording material of primarily GeTeSb, a second dielectric film 406 of primarily ZnS, and a translucent reflection film 407 made of a silver alloy are then successively sputtered onto the pattern transfer surface of the sheet substrate 403. These layers form a data recording layer. The sputtered recording film 405 is initially amorphous, and can be initialized by irradiation with (exposure to) a collimated laser beam, causing the amorphous film to crystallize. The first substrate 309 shown in FIG. 3 is thus produced with a data recording layer.

Figure 5:
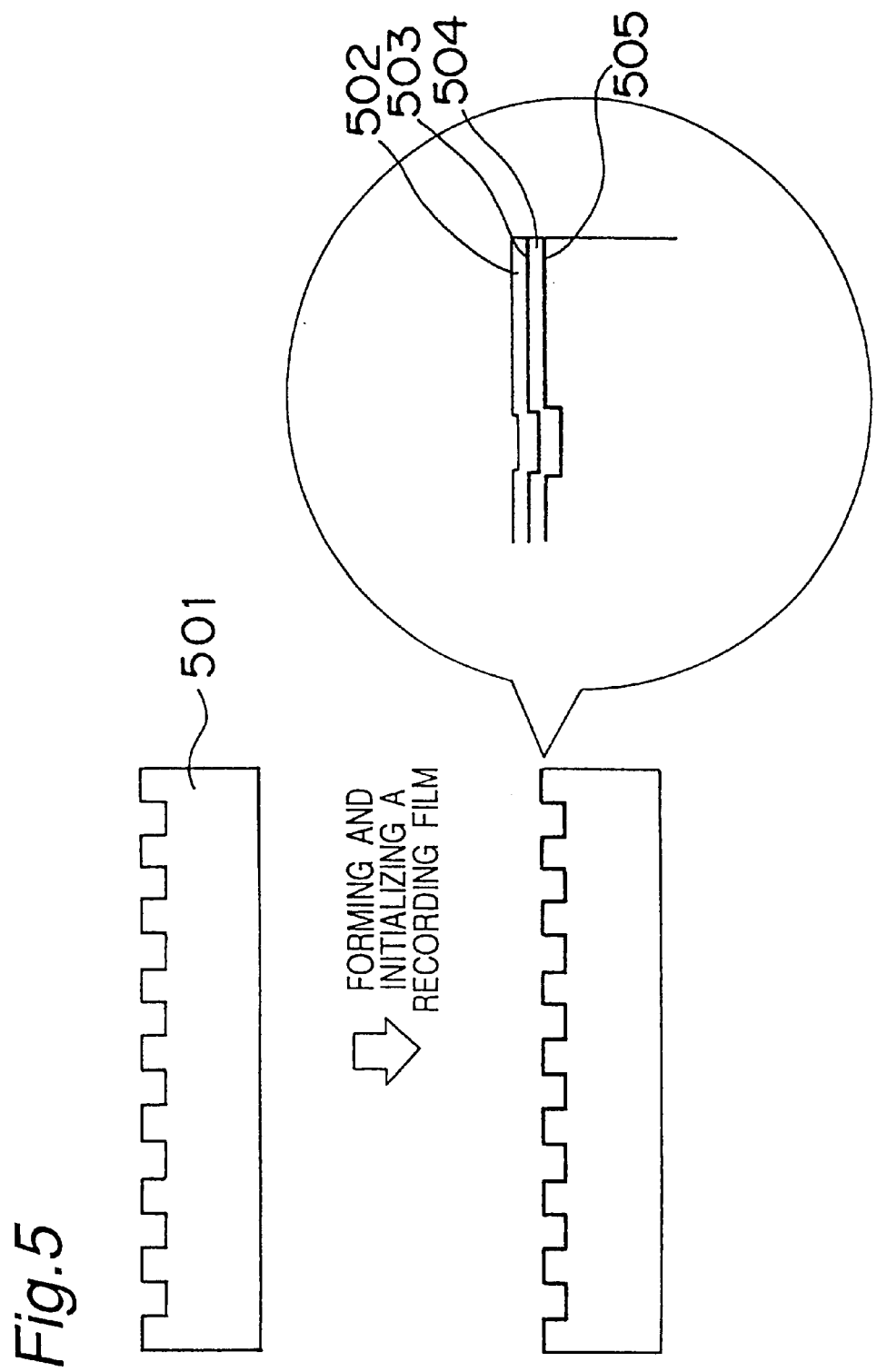
FIG. 5 is a diagram of a second duplication process in the first embodiment of the invention.

A second substrate 310 (FIG. 3) with a data recording layer is then produced in a second duplication step using the second stamper 308. FIG. 5 shows this second duplication process. First, an approximately 1.1 mm thick polycarbonate substrate master 501 is formed with the second stamper pattern transferred thereto by injection molding based on the second stamper 308. Before pattern transfer, an Al alloy reflection film 505, second dielectric film 504 of primarily ZnS, recording film 503 made from a phase change material of primarily GeTeSb, and a first dielectric film 502 of primarily ZnS are sputter laminated in sequence to form the data recording layer. As with the first substrate described above, the data recording layer is initialized by exposure to collimated light. This process results in the second substrate 310 with a data recording layer.

A UV setting resin is then sprayed concentrically onto the data recording layer surface of the first substrate 309. The first substrate 309 is then overlaid to the data recording layer of the second substrate 310 with this UV setting resin layer in between, the first and second substrates are spun to remove any excess UV setting resin and form an approximately 20 µm to 40 µm thick resin layer. The resin layer is then exposed to UV light to set the UV setting resin and produce a multilayer optical disc 311 with two data recording layers.

The guide groove width on the substrate surface can be changed in each data recording layer by adjusting the laser density used to produce the masters. When a positive resist is used as the photoresist, the exposed part will be removed by development. The guide groove width can then be increased by increasing the density of the laser beam used to expose the photoresist. A multilayer optical disc in which the guide groove width increases with the recording layer depth as seen from the side to which the read laser is incident can then be produced by producing a master with the desired groove width and transferring the desired guide groove width.

Embodiment 2

Figure 6:
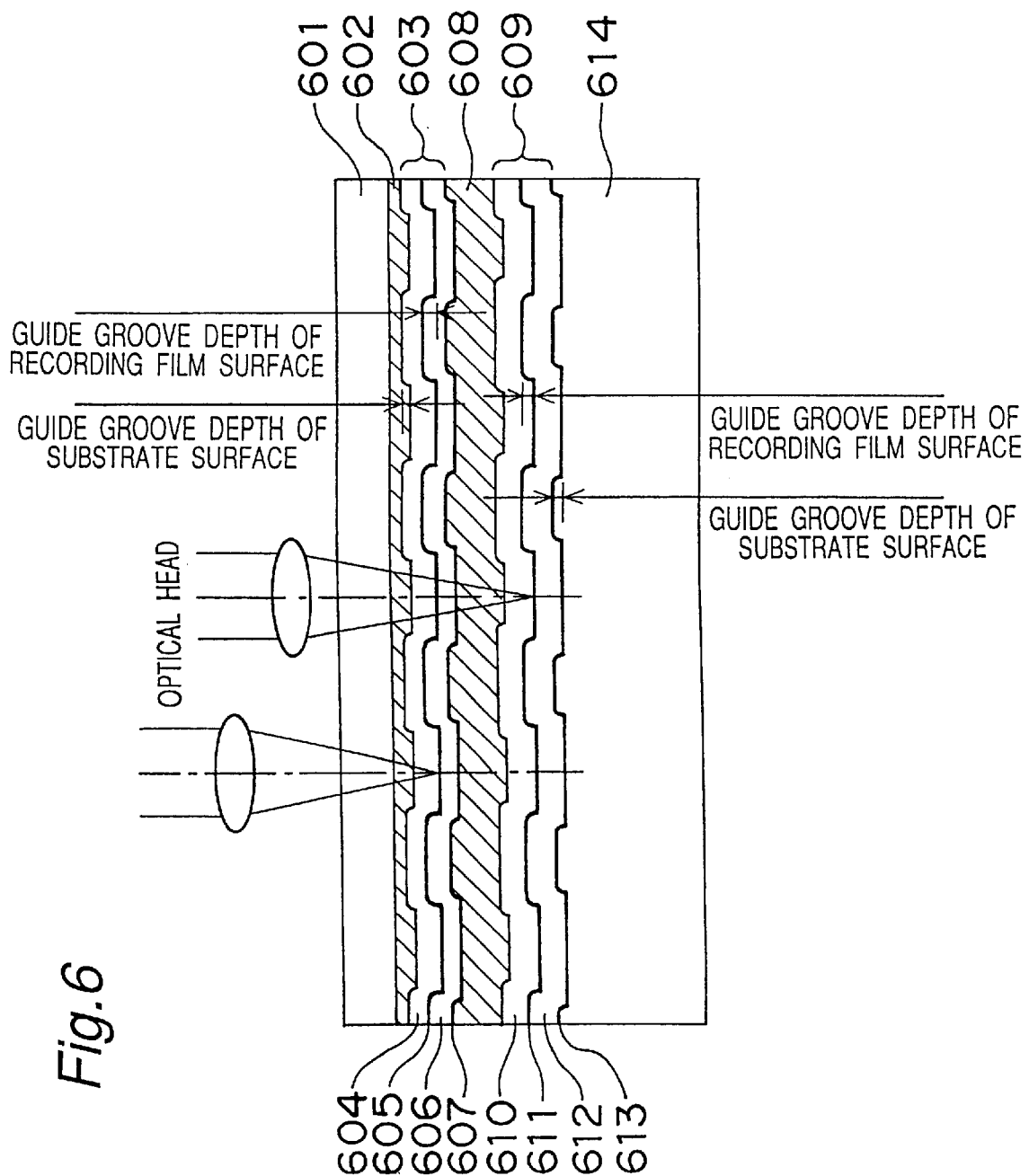
FIG. 6 is a sectional view of the structure of a multilayer optical disc according to a second embodiment of the present invention.

FIG. 6 is a sectional view along the radius of a multilayer optical disc according to a second embodiment of the invention. As with a multilayer optical disc according to the first embodiment of the invention, a multilayer optical disc according to this second embodiment has two data recording layers laminated together an approximately 0.1 mm thick polycarbonate sheet 601, an approximately 10 µm thick first UV-cure resin layer 602 to which the guide groove pattern is transferred, a transparent first data recording layer 603, a second UV-cure resin layer 608 separating first data recording layer 603 and second data recording layer 609, a second data recording layer 609, and a polycarbonate substrate 614 to which the guide groove pattern is transferred.

The first data recording layer 603 is a lamination of recording film 605 made from a phase change recording material of primarily GeTeSb, dielectric films 604 and 606 of primarily ZnS, and translucent reflection film 607, a metal alloy of primarily Ag. The recording film 605 is disposed between dielectric films 604 and 606. Data is recorded to the second data recording layer 609 and read from the second data recording layer 609 through the first data recording layer 603. The transmittance of the first data recording layer 603 is therefore set to approximately 50%.

The second data recording layer 609 is similarly a lamination of recording film 611 made from a phase change recording material of primarily GeTeSb, dielectric films 610 and 612 of primarily ZnS, and an Al alloy reflection film 613. The recording film 611 is disposed between the dielectric films 610 and 612.

The base layer on which the first data recording layer 603 is formed is the first UV setting resin layer 602 in which the guide groove pattern is formed. The base layer on which the second data recording layer 609 is formed is the other polycarbonate substrate 614 in which the guide groove pattern is also formed.

As described above, data is recorded by emitting a laser beam from the polycarbonate sheet 601 side of the media to form marks in the guide groove part of each recording film. Data is likewise reproduced by emitting a laser beam from the polycarbonate sheet 601 side of the disc and reading the light reflected from the marks formed in the guide groove part of the recording films.

Figure 8:
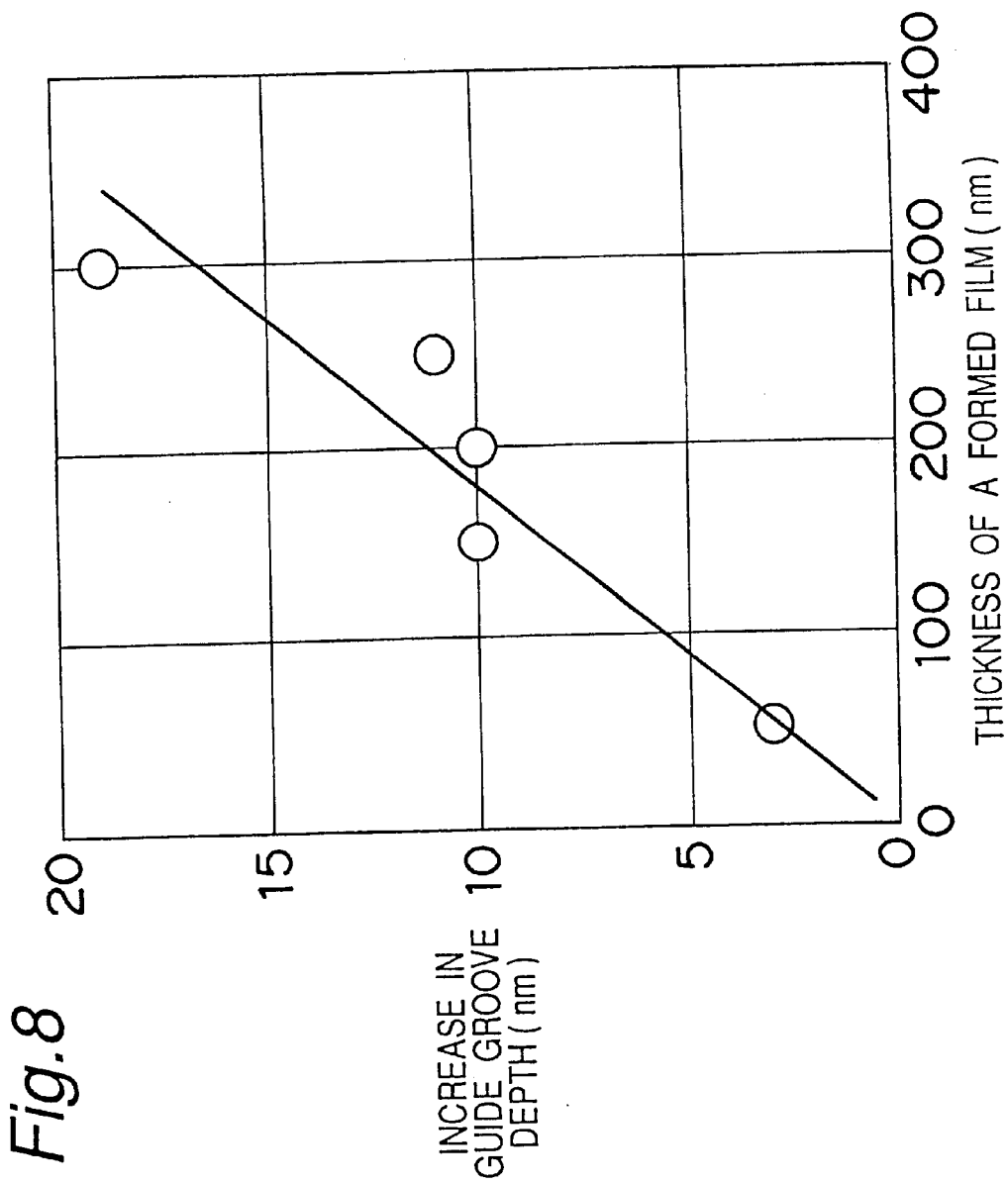
FIG. 8 is a graph of the relationship between groove depth and signal amplitude.
Figure 9:
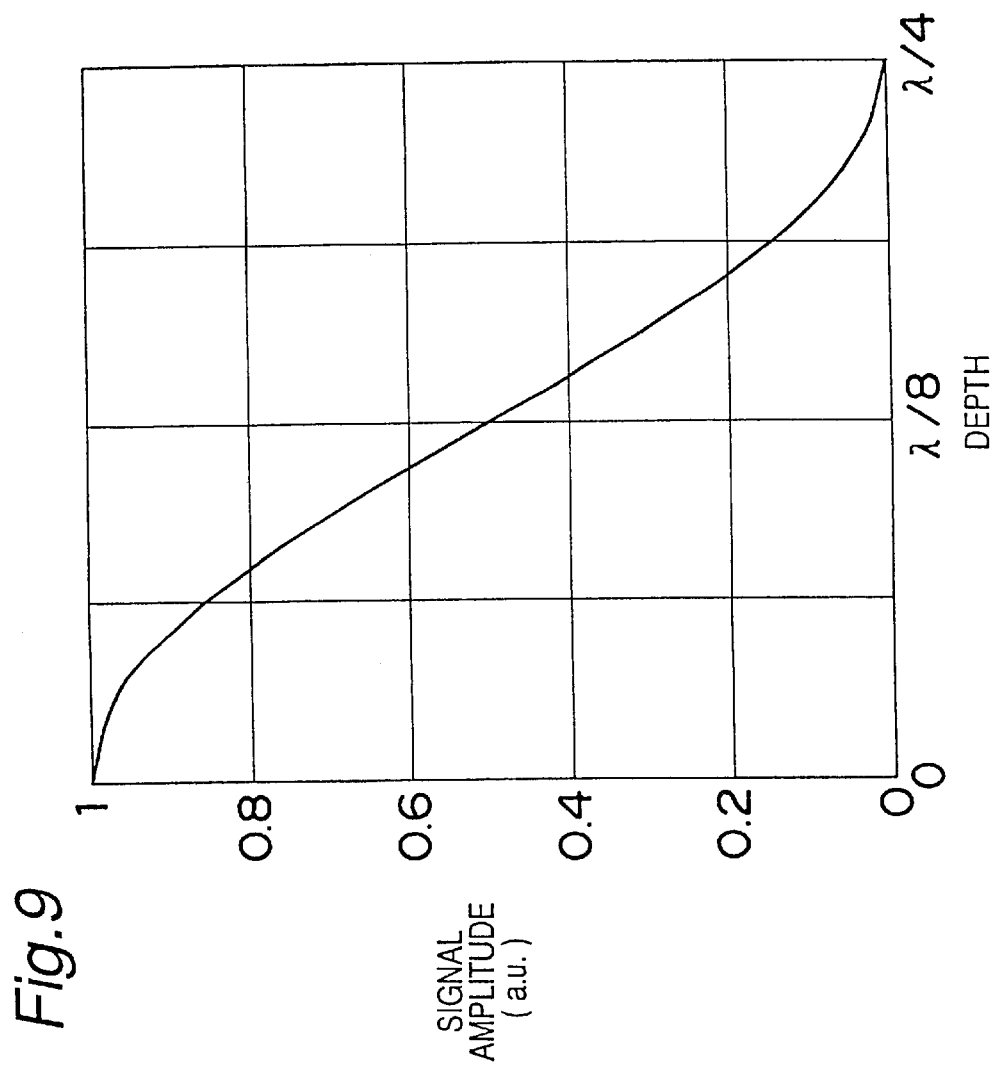
FIG. 9 is a graph of the relationship between film thickness and increase in groove depth.

When the films are formed on the substrate in this embodiment, groove depth is changed in addition to the guide groove width as described in the first embodiment. FIG. 8 shows the relationship between the thickness of the formed film and the increase in guide groove depth. It will be understood that the depth of the guide groove at the formed film surface increases as the thickness of the formed film increases. In addition, light reflected from the data recording layer decreases as the guide groove depth increases. FIG. 9 is a graph of the relationship between signal amplitude proportional to the detected amount of reflected light, and guide groove depth converted to light path length where $\lambda$ is the wavelength of the laser beam emitted from the optical head. It will be understood from FIG. 9 that reflection from the data recording layer decreases in conjunction with an increase in guide groove depth to a minimum of $\lambda/4$ converted to light path length.

With a multilayer optical disc configured as shown in Table 1, the guide groove depth is different in each data recording layer as shown in Table 7.

TABLE 7

|  | Increase in guide groove depth |
| --- | --- |
| 1st data recording layer | 4.3 nm |
| 2nd data recording layer | 6.9 nm |

We next produced multilayer optical discs in which the correction shown in Table 7 is added to the multilayer optical disc configuration shown in Tables 2 and 3. Jitter and the carrier noise ratio were then measured as described above using a 405 nm wavelength laser and an optical head with a 0.85 numerical aperture. The jitter results are shown in Table 8 and the carrier noise ratio results in Table 9.

TABLE 8

|  | Guide groove width on substrate surface | | |
| --- | --- | --- | --- |
|  | 0.16 µm | 0.26 µm | 0.4 µm |
| 1st data recording layer | 12% | 10% | 7% |
| 2nd data recording layer | 12% | 10% | 7% |

TABLE 9

|  | Guide groove width on substrate surface | | |
| --- | --- | --- | --- |
|  | 0.16 µm | 0.26 µm | 0.4 µm |
| 1st data recording layer | 48 dB | 50 dB | 56 dB |
| 2nd data recording layer | 48 dB | 50 dB | 56 dB |

As will be known from Tables 8 and 9, an improvement in reproduction signal quality in terms of jitter and carrier noise ratio is observed when guide groove depth correction at the substrate surface is added, and substantially the same jitter and carrier noise ratio characteristics are achieved on both data recording layers. This improvement is not observed at a groove width of 0.4 µm, and it will therefore be understood that the multilayer optical disc according to the present invention is effective when the groove width is approximately 0.3 µm or less.

It will be further noted that depending upon the structure of each data recording layer, even better playback signal characteristics can be achieved by adjusting the correction of the difference in the guide groove depth at the substrate surface and the recording film surface. In this case, the correction applied to each signal recording layer can be adjusted appropriately.

A method for manufacturing a multilayer optical disc according to this second embodiment is described next, noting first that the manufacturing process for this second embodiment multilayer optical disc is substantially identical to the method for a multilayer optical disc according to the first embodiment. Only the differences between the two methods are therefore described below.

As shown in FIG. 8, groove depth changes as a result of film formation. Therefore, when preparing the first and second plates coated with the photoresist, the film thickness of the photoresists is changed according to the desired difference in groove depth in order to produce masters with the desired groove depths. These can then be used to produce multilayer optical discs according to this second embodiment.

As described above, the guide groove depth is changed by changing the thickness of the photoresist applied to the two master plates in the multilayer optical disc manufacturing method according to this second embodiment. However, it is also possible to produce master plates with different guide groove depths by applying the photoresist to a thickness greater than the desired depth, and then adjusting the density of the laser used to record the desired pattern. It is also effective to change only the width or the depth of the guide grooves on the substrate surface. Changing both the width and the depth of the guide groove will, however, yield superior characteristics.

The first and second embodiments describe the structure and manufacturing method for a multilayer optical disc produced by first forming the desired data recording layers on separate substrates and then bonding the substrates together. However, it is also possible to manufacture a multilayer optical disc by using substrates with the desired guide grooves formed thereon, or a substitutable film, and forming the data recording layers according to those guide grooves. This method will also yield the same benefits and effects described above.

The first and second embodiments also describe a multilayer optical disc having two data recording layers, but the invention can also be applied to multilayer optical discs having three or more data recording layers enabling data to be recorded and reproduced from one side of the disc.

Embodiment 3

This third embodiment of the invention describes a high density optical disc that is capable of recording 20 GB or more. This optical disc is manufactured by a conventional injection molding substrate manufacturing method after first preparing masters using a laser beam recorder having a 230 nm or longer laser such as currently being developed as the light source. Resistance to the effects of noise deterioration resulting from the transfer characteristics when molding the protruding land parts of the substrate is improved by using the recessed trenches on the substrate as the guide groove for signal recording.

The groove width of the final guide groove as seen from the side to which the laser beam for recording and reproducing is incident is determined by the data recording layer (thin film layer) including the recording film layer accumulated on top of the land and groove pattern on the surface of the injection molded substrate. The final groove width obtained on a 4.7 GB DVD-RAM disc comprising a phase change recording layer of Ge (germanium), Sb (antimony), and Te (tellurium) and a dielectric films of ZnS and SiO2 is determined by the film thickness to the recording film layer accumulated on the edges of the guide groove formed on the substrate.

The film thickness to the recording film layer accumulated at the groove edge is greatly affected by the angle of the groove edge. As the edge angle increases, it becomes more difficult for the recording film layer to accumulate at the groove edge, and the final groove width obtained with the recording film layer is substantially no different from the groove width formed at the substrate.

Figure 10A:
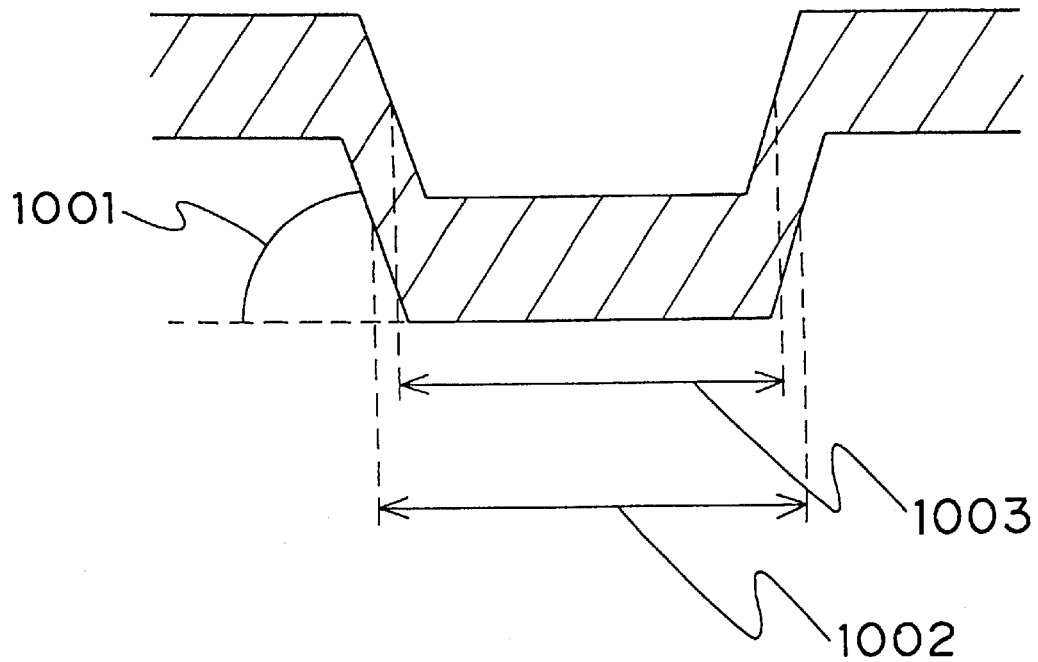
FIG. 10A is a schematic view of effect when the groove edge angle is large.
Figure 10B:
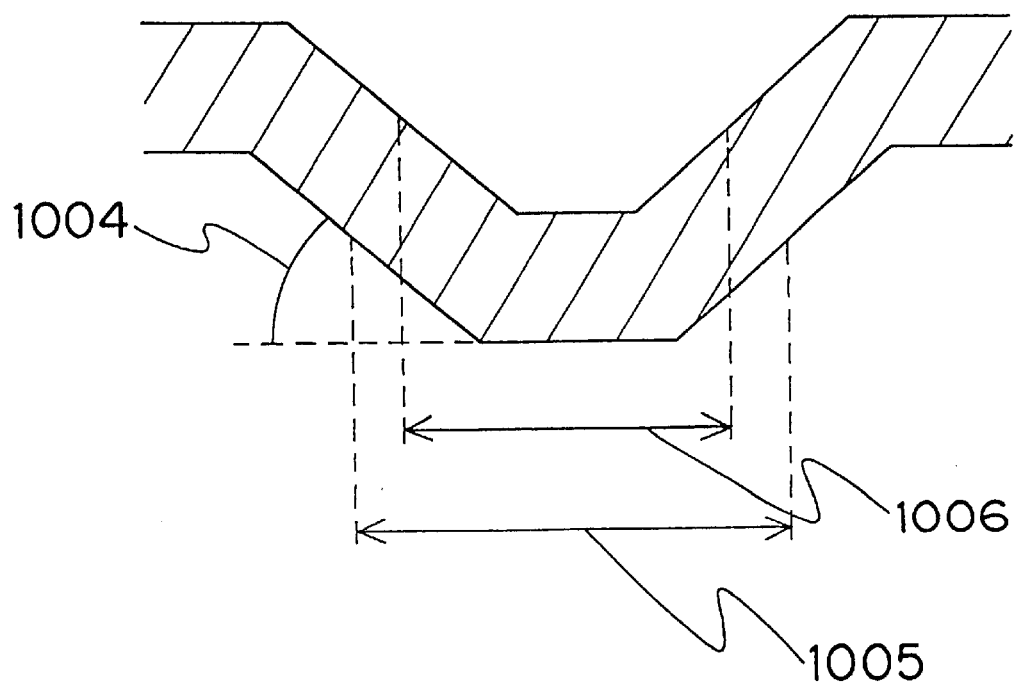
FIG. 10B is a schematic view of effect when the groove edge angle is small.

FIG. 10 is a schematic drawing showing the effects of the groove edge angle on the recording film layer accumulated at the groove edge. FIG. 10A shows a large groove edge angle 1001. FIG. 10B shows a small groove edge angle 1004. As shown in FIG. 10A, when the groove edge angle 1001 is large, the groove width 1002 at the substrate and the groove width 1003 of the recording film layer are substantially the same. As shown in FIG. 10B, however, when the groove edge angle 1004 is small, the difference between the groove width 1005 at the substrate and the groove width of the recording film layer is relatively great. In a 4.7 GB DVD-RAM disc having grooves shaped as shown in FIG. 10A, the groove edge angle is approximately 70 degrees to 80 degrees. Therefore, when a phase change film is accumulated so that the film thickness from the substrate to the recording film layer is approximately 50 nm, there is substantially no change between the groove width formed on the substrate and the final groove width after the recording film layer is formed. In other words, the groove width at the substrate must be substantially the same as the desired width determined by the final recording and reproducing characteristics for a 4.7 GB DVD-RAM disc.

The track pitch of a 4.7 GB DVD-RAM disc is a relatively wide 0.615 μm, and the substrates can be manufactured with sufficient stability using currently available laser beam recorders and mastering processes. Furthermore, DVD-RAM media are made by injection molding approximately 0.6 mm thick resin substrates and then bonding two such substrates together, and good resin transfer over the entire surface is possible with a substrate manufacturing process using 0.6 mm thick substrates with a 0.615 μm track pitch (an approximately 0.615 μm guide groove width).

However, to make a 120 mm diameter optical disc for compatibility with conventional CDs and DVDs and the 20 GB capacity needed to record at least two hours of digital broadcasting content from a broadcast satellite, for example, a track pitch of 0.36 μm or less is needed. If the same land and groove recording method used with conventional DVD-RAM media is used and the track pitch is 0.36 μm, the guide groove width must also be approximately 0.36 μm, that is, the same as the track pitch. Such guide grooves can be manufactured using laser beam recorders currently be developed with a light source wavelength of 230 nm or greater). The tracking polarity must be switched during playback, however, because the tracking polarity differences in lands and grooves when the disc is read. In addition, recording and reproducing characteristics may differ between the lands and grooves.

Groove recording or land recording methods that record signals to only grooves or lands, respectively, can be used instead of land and groove recording. These methods resolve these problems with land and groove recording, that is, the tracking polarity changing and the recording and reproducing characteristics being different in the lands and grooves. The drawback, however, is that the groove width must be approximately half the track pitch. If the track pitch required to produce a 20 GB capacity optical disc is 0.36 μm or less, it will be extremely difficult to achieve a groove width of only half the track pitch using laser beam recorders such as currently being developed. If the track pitch is 0.36 μm or less when manufacturing optical disc substrates using conventional injection molding, sufficiently transferring the pattern protrusions (lands) on the substrate to which the resin is filled becomes extremely difficult even if the resin sheet thickness is the same 0.6 mm as the DVD-RAM disc.

The spot diameter of the laser beam used for recording and reproducing must also be reduced in order to achieve an optical disc with a 20 GB or greater storage capacity. That is, while a laser with a wavelength of about 650 nm is currently used, the laser beam wavelength must be approximately 400 nm with 20 GB media. It is also proposed that the numerical aperture of the objective lens used for recording and reproducing must be improved from the current approximately 0.6 to about 0.85. However, shortening he wavelength of the recording and reproducing optics and increasing the numerical aperture of the objective lens significantly narrows tolerance to tilting of the optical disc. The thickness of the optical disc substrate must be reduced in order to resolve this problem, but if the substrate thickness is less than 0.3 mm, substrate manufacture by means of conventional molding methods is extremely difficult regardless of the land and groove pattern.

Described next below are how to determine what track pitch and recording and reproducing system are required to achieve a 20 GB capacity optical disc, and then the steps in the disc manufacturing method. First, note that with a standard 4.7 GB capacity DVD-RAM disc the laser wavelength of the recording and reproducing system is 650 nm and the numerical aperture of the objective lens for collimating the laser beam on the recording film layer of the optical disc is approximately 0.6. The track pitch is 0.615 $\mu$m.

It has been proposed that to achieve an optical disc with a 20 GB or greater storage capacity it is necessary to use a laser with a wavelength of approximately 400 nm as the light source of the recording and reproducing system. If a blue semiconductor laser or blue laser light source using an SHG element (390 nm to 450 nm laser wavelength), the numerical aperture NA of the objective lens of the recording and reproducing head must be $$NA=((20*390^2/(4.7*(\lambda/na)^2))^{1/2}$$

where $\lambda$ is the wavelength of the DVD-RAM laser light source and na is the numerical aperture of the objective lens of the recording and reproducing head. This means that the numerical aperture of the objective lens must be 0.7 or greater.

Furthermore, if we assume that TP is the track pitch of the guide grooves for signal recording and tp is the track pitch of a DVD-RAM disc, then $$TP=tp*(450/\lambda)*(na/NA).$$

As the track pitch of the DVD-RAM disc is 0.615 $\mu$m, the track pitch of an optical disc with a 20 GB or greater storage capacity must be 0.36 $\mu$m or less.

An optical disc according to this third embodiment of the invention is described next. FIG. 11 is a schematic sectional view through the radius of an optical disc according to this third embodiment. As shown in FIG. 11, this optical disc has laminated in sequence a substrate 1101, a reflection film 1102, dielectric layer 1103, recording film layer 1104, dielectric layer 1105, and transparent layer 1106. Data is recorded to the recessed trench part of the recording film layer 1104 as seen from the side to which the laser beam is incident. The laser beam is reflected by reflection film 1102, becoming read/write beam 1109. The read/write beam 1109 is converged by the objective lens 1108. This trenched part of the optical disc is often called the land. As will be known from FIG. 11, the land width 1111 of the land 1107 of recording film layer 1104 is narrower than the land width 1110 of the land at substrate 1101. This is because the dielectric layer 1103 and recording film layer 1104 are accumulated on top of the land of the substrate 1101. The land can therefore be said to be the part of which the width becomes narrower as layers accumulate in order from the substrate 1101.

An optical disc as shown in FIG. 11 is manufactured as follows.

First, a photoresist plate having a photoresist coated over the surface of a glass plate is exposed to a desired pattern using a laser beam recorder, and then developed. This forms the land and groove pattern of the signal recording guide grooves on the glass plate. Next, a nickel thin film is sputtered onto the photoresist plate with the land and groove pattern, which is then nickel plated using the nickel thin film as an electrode. After plating, the plated nickel plate is separated from the photoresist plate, and the land and groove pattern formed on the photoresist plate is thus transferred to the nickel plate. The nickel plate is then cleaned, the back polished, and stamped to the desired inside and outside circumference to dimensions complete a stamper, called a stamper, for optical disc substrates.

Resin is then injection molded using this stamper to produce the optical disc substrate. This completes the substrate 1101 having the land and groove pattern that becomes the guide grooves for signal recording formed on one side. The substrate 1101 is thus manufactured from polycarbonate resin using an injection molding processing to an approximately 1.1 mm thickness.

A thin film layer including the recording film layer is then formed on this substrate 1101. Specifically, an approximately 30 nm thick reflection layer made from an Al alloy, an SiO2 dielectric layer approximately 20 nm thick, an approximately 15 nm thick phase change recording film of Ge (germanium), Sb (antimony), and Te (tellurium), and an approximately 50 nm thick dielectric layer of SiO2, are sequentially sputtered onto the substrate 1101. The accumulated thin film layers are then coated with an approximately 0.1 mm thick transparent layer to complete the optical disc. While the optical disc is completed by coating the thin film layers with a transparent layer, it is also possible to bond a 0.1 mm thick resin sheet over the thin film layers with an intervening adhesive layer.

In this third embodiment an approximately 250 nm wavelength laser is used as the light source of the laser beam recorder to record signal recording guide grooves at a 0.32 $\mu$m track pitch. The thickness of the thin film layers from the substrate to the recording film layer is approximately 0.05 $\mu$m. The land width 1110 formed on the substrate in the trench as seen from the laser incidence side of the disk is recorded to be approximately 60% of the 0.32 $\mu$m track pitch at the half value width of the trench edge. The land width is determined by the characteristics of the sensitized photoresist, the numerical aperture (NA) of the objective lens, and the wavelength of the laser beam recorder light source. The formed groove width increases as the density of the laser beam used for pattern formation increases.

It is important to note that the groove edge angle 1112 is a relatively small approximately 65 degrees where the edge incline is greatest. The groove edge angle 1112 can be adjusted by changing the developer conditions, such as developing in an inorganic developer solution, or changing the constriction of the laser beam when recording with the laser beam recorder. When the layers are built up in order from the substrate 1101, the groove width of the trench (particularly land width 1111 of recording film layer 1104) becomes narrower in conjunction with the thickness of the thin film layers built up on the edges of the land and groove pattern, but the width reduction can be minimized by making the groove edge angle 1112 relatively small. The land width 1111 of the recording film layer is actually approximately 46% of the 0.32 µm track pitch. There is, therefore, sufficient tolerance in the groove width 1111 of the recording film layer for recording and reproducing. The master plates can also be easily manufactured because the guide groove width 1110 of the trench part of the substrate can be made wide relative to the groove width 1111 of the trench part of the recording film layer after film formation.

Evaluating the recording and reproducing performance of an optical disc manufactured as described above confirmed a stable tracking servo and recording characteristics sufficient for a recordable and readable optical disc. The numerical aperture of the objective lens in the read/write head was 0.85 and the laser beam wavelength was 405 nm in these tests. Land 1107 in the trench as seen from the laser incidence side of the optical disc was used as the guide groove for signal recording.

The guide groove width 1110 of the trench in the substrate 1101 can be made wide relative to the groove width of the trench in the recording film layer 1104 after film formation with the optical disc of this third embodiment by using the trench part 1107 of the substrate 1101 as the guide groove for signal recording and by using a small groove edge angle 1112. An optical disc with a 20 GB or greater storage capacity in one layer on one side can therefore be achieved because it is possible to obtain a trench width 1111 in the recording film layer 1104 sufficient for recording and reproducing.

It should be noted that when the thickness from substrate 1101 to recording film layer 1104 is 0.05 µm or less, there is less narrowing of the groove width after film formation relative to the groove width 1110 at the substrate. It was also confirmed that if the thickness from substrate 1101 to recording film layer 1104 is 0.05 µm or more, narrowing of the groove width after film formation relative to the groove width 1110 at the substrate is greater.

In this third embodiment of the invention the land width 1110 of the prepared substrate is approximately 60% of the 0.32 µm track pitch. The groove width that can be stably recorded using current laser beam recorders is approximately 0.18 µm. This is approximately 50% of the minimum 0.36 µm track pitch required to achieve an optical disc with a storage capacity or 20 GB or more. In other words, a groove width narrower than 50% of the 0.36 µm track pitch cannot be reliably recorded using currently available laser beam recorders.

The effect of the relationship between track pitch and guide groove width 1110 at the substrate on recording and reproducing characteristics is described next.

A 10 MHz single frequency signal was recorded at 5 m/sec linear read/write velocity using an objective lens with a 0.85 numerical aperture and a read/write head using a 405 nm wavelength laser for this evaluation.

If the guide groove width 1110 on the substrate is 80% or more of the 0.32 µm track pitch, the amplitude of the tracking error signal decreases. This causes a tendency for unstable tracking, and playback could not be evaluated.

Figure 14:
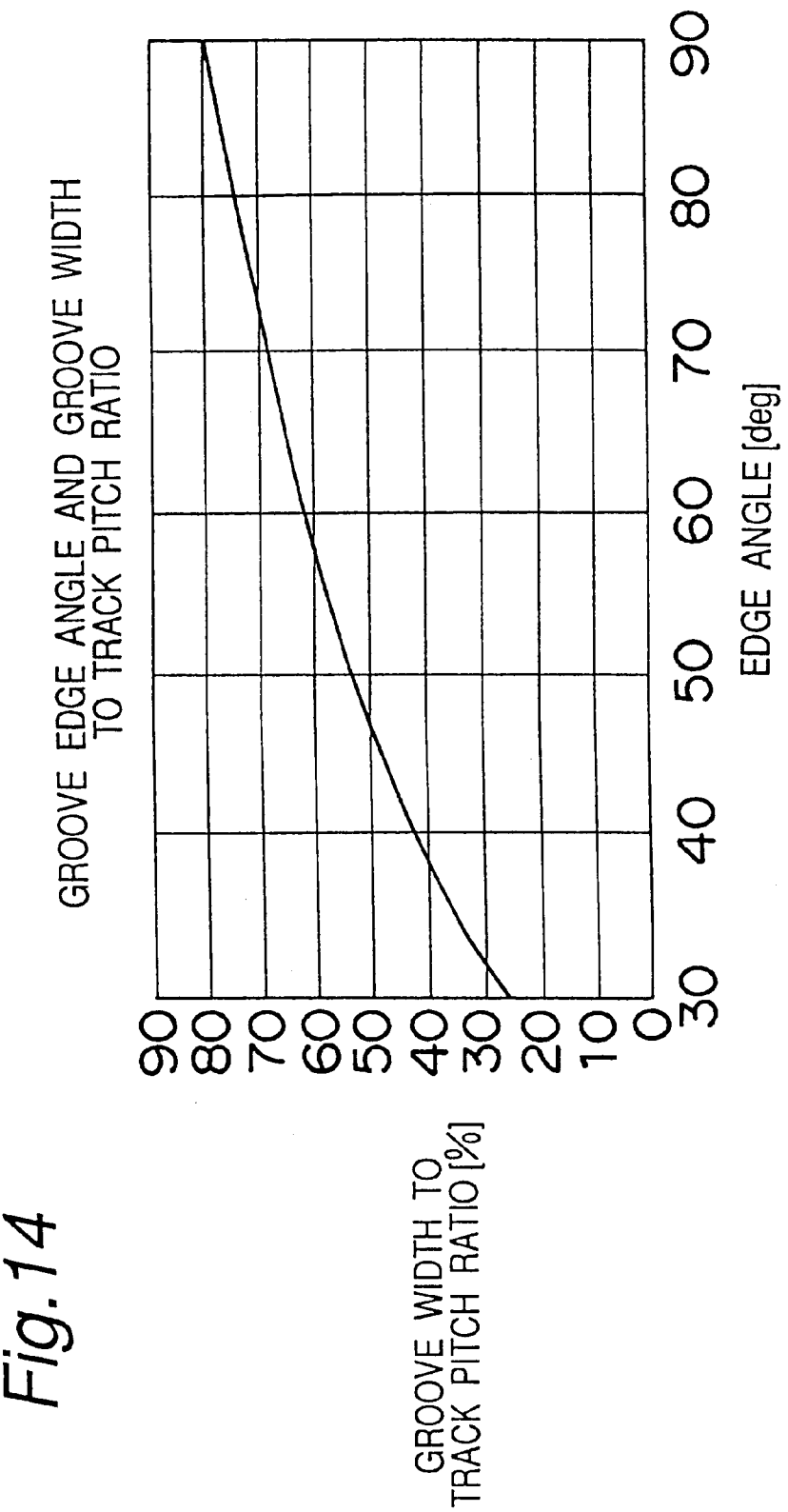
FIG. 14 is a graph of the relationship between groove edge angle and the groove width to track pitch ratio after the recording film is formed.

We measured the relationship between the groove edge angle 1112 and the groove width 1111 of the recording film layer after forming the recording film layer 1104 when the guide groove width 1110 on the substrate is approximately 80% of the track pitch. FIG. 14 shows the relationship between groove edge angle and groove width in the recording film layer. Groove width was measured at the half width of the groove edge where the "half value width" is the groove width between the midpoints of the two edges forming the groove. It was confirmed that recording film layer groove width decreases as the edge angle becomes smaller.

When the guide groove width 1110 at the substrate is approximately 80% of the track pitch, cross erase (CE), that is, erasing marks recorded to an adjacent track, increases as the groove edge angle increases, that is, as the groove width increases.

When the groove edge angle is approximately 75 degrees, the groove width 1111 after film formation is approximately 70% of the track pitch (0.32 µm), and cross erase CE drops to a level at which there are no problems. There is, however, a particular increase in cross erase CE when the groove edge angle exceeds 75 degrees. This is because heat transfer to an adjacent track from the reflection film 1102 occurs during signal recording, and this heat affects marks recorded in the adjacent track.

When the groove edge angle 1112 is approximately 75 degrees, crosstalk (CT), that is, reproduction of marks recorded to an adjacent track, is also at level at which there are no problems during signal playback. It was also confirmed, however, that crosstalk CT increases as the groove edge angle increases. This is because recording mark width increases when the groove width increases, and mark edges in an adjacent track are detected by that part of the read/write spot where beam density is high.

There is a sharp increase in groove noise emanating from the guide groove when the groove edge angle is 30 degrees or less. This is because the area of the guide groove edges formed by transfer molding of the photoresist surface pattern increases as seen from the side to which the laser is incident, and irregular reflections occur.

When the signal was recorded to and read from the protruding groove of the substrate, groove noise emanating from the guide groove is high and the carrier noise ratio to the land was low at approximately 10 dB. One reason for noise being high may be that as the width of the trench (land) part of the substrate increases, the width of the protrusion (groove) between the trenches where the resin must be filled during molding decreases, and pattern transfer is difficult during the molding process. Groove noise may therefore deteriorate as a result of the roughness of the resin surface. Another possible cause for increased groove noise is the roughness of the photoresist surface because the grooves are formed in the photoresist when the photoresist plate is exposed.

Embodiment 4

The third embodiment of the invention described an optical disc having a single recording film layer with a storage capacity of 20 GB or more. This fourth embodiment describes an optical disc having two recording film layers.

Figure 12:
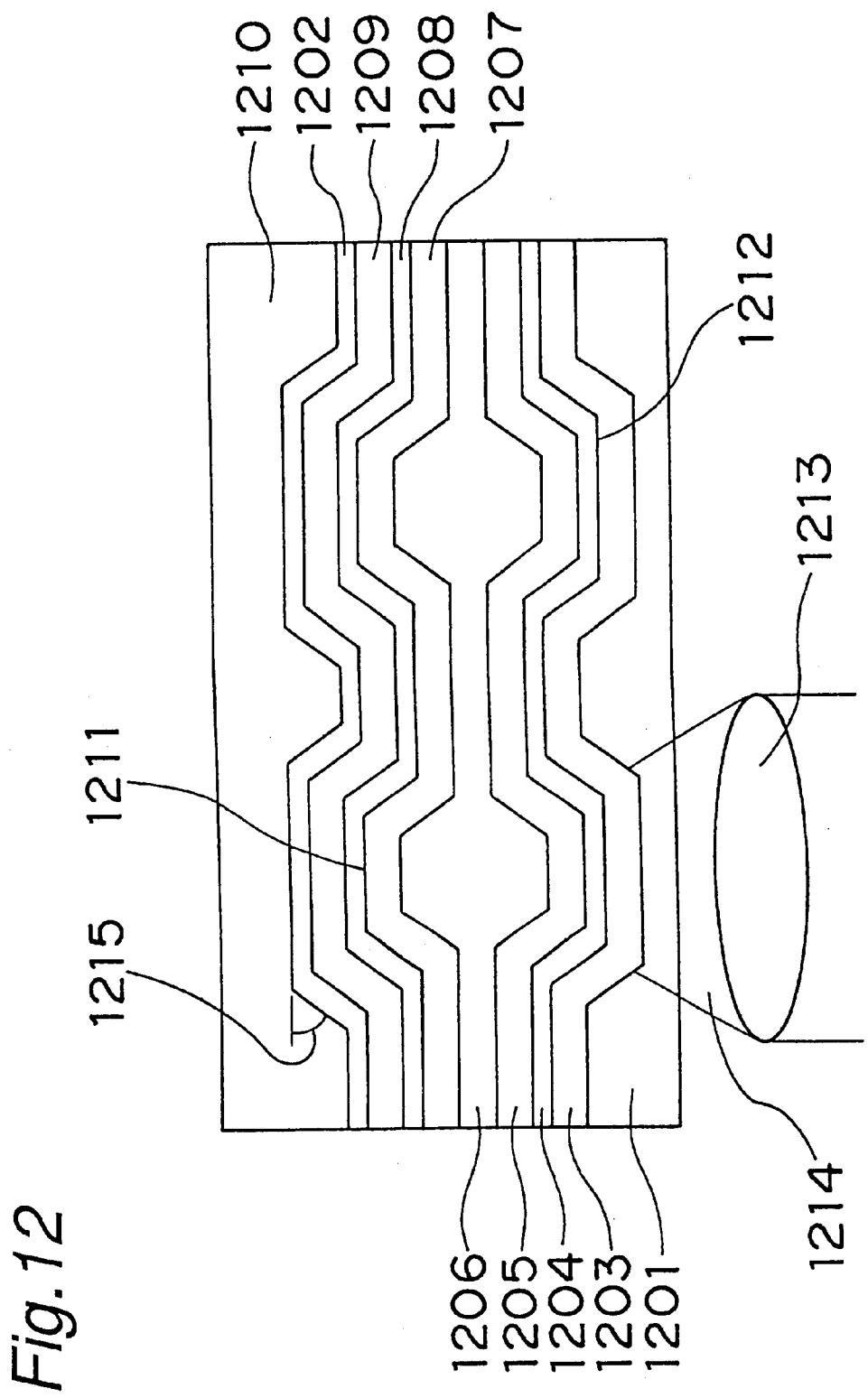
FIG. 12 is a diagram of the structure of an optical disc in the fourth embodiment of the invention.

FIG. 12 is a schematic section diagram through the radius of an optical disc according to this fourth embodiment. As shown in FIG. 12, this optical disc has laminated in sequence a first substrate 1201, dielectric layer 1203, first recording film layer 1204, dielectric layer 1205, adhesive layer 1206, dielectric layer 1207, second recording film layer 1208, dielectric layer 1209, a reflection film 1202, and a second substrate 1210. In an optical disc according to this fourth embodiment, data is recorded to the first recording film layer 1204, which appears as a trench when seen from the laser incidence side of the optical disc, and to the second recording film layer 1208. The laser beam is reflected by reflection film 1202, becoming read/write beam 1214. The read/write beam 1214 is converged by the objective lens 1213. Land 1211, which is a trench as seen from the laser incidence side of the optical disc, is formed on the second substrate 1210. Groove 1212, which protrudes toward the laser incidence side of the optical disc, is formed on the first substrate 1201.

This optical disc is manufactured as described below. As described in the third embodiment, a nickel plated stamper formed with the signal recording guide grooves is first made from a photoresist plate recorded with a laser beam recorder. A polycarbonate injection molding is then made using this stamper, resulting in the second substrate 1210 having the signal recording guide grooves formed as a land and groove pattern on one side.

The first substrate 1201 is then made using another nickel stamper formed with substantially the same signal pattern. An approximately 0.1 mm thick sheet is coated with a UV setting resin, the stamper is pressed to the UV setting resin and irradiated with UV light to set the UV setting resin. The stamper is then removed to produce the approximately 0.1 mm thick first substrate 1201 having transferred thereto the land and groove pattern of the stamper.

An approximately 30 nm thick reflection layer made from an Al alloy, an approximately 20 nm thick SiO2 dielectric layer, an approximately 15 nm thick phase change recording film of Ge (germanium), Sb (antimony), and Te (tellurium), and an approximately 50 nm thick dielectric layer of SiO2, are sequentially sputtered onto the land and groove pattern side of the second substrate 1210. The thin films laminated to the second substrate are similarly sputtered onto the land and groove pattern side of the first substrate. Specifically, an approximately 50 nm thick dielectric layer of SiO2, an approximately 6 nm thick phase change recording film of Ge, Sb, and Te, and an approximately 50 nm thick dielectric layer of SiO2 are sequentially sputtered onto the land and groove pattern side of the first substrate. Note that the reflection film is not formed in the thin film layers of the first substrate because the laser must pass through these layers to read and write data to the first recording film layer 1204.

The first and second substrates are then bonded together with an adhesive layer intervening between the recording film layers of the two substrates to complete an optical disc according to this fourth embodiment. It should be noted that the first and second substrates are bonded so that grooves as seen from the laser incidence side of the optical disc in the second substrate 1210 face lands in the first substrate 1201, and lands in the second substrate 1210 face grooves in the first substrate 1201.

A laser with an approximately 250 nm wavelength is used as the light source of the laser beam recorder in this fourth embodiment to record signal recording guide grooves at a 0.32 μm track pitch. As noted above, the thickness from the first substrate 1201 to the first recording film layer 1204 in the thin film layers sputtered onto the first substrate 1201 is approximately 0.05 μm, and the thickness from the second substrate 1210 to the second recording film layer 1208 in the layers sputtered onto the second substrate 1210 is approximately 0.05 μm.

The land width 1211 of the trench on the second substrate as seen from the laser incidence side of the disk is recorded to be approximately 60% of the 0.32 μm track pitch at the half value of the pattern edge. As in the third embodiment, the groove edge angle 1215 is approximately 65 degrees where the edge incline is greatest. The land width of the recording film layer after the first recording film layer 1204 is formed on the patterned side of the first substrate 1201 is narrowed by the thickness of the thin films built up on the pattern edges, and is approximately 46% of the 0.32 μm track pitch.

The width of the protrusion in the first substrate 1201, that is, the grooves that protrude as seen from the laser incidence side of the optical disc, are recorded to be approximately 60% of the 0.32 μm track pitch at the half value of the pattern edge. As with the groove edge angle of the first substrate, the groove edge angle is approximately 65 degrees where the edge incline is greatest. The groove width of the recording film layer after the second recording film layer 1208 is formed on the patterned side of the second substrate 1210 is approximately 46% of the 0.32 μm track pitch.

The guide groove width is approximately 60% of the 0.32 μm track pitch in the first substrate 1201 and second substrate 1210 of an optical disc according to this fourth embodiment. As described in the third embodiment, currently developed laser beam recorders cannot consistently record a groove width of 50% or less of the 0.36 μm track pitch, but can be used to manufacture an optical disc according to this fourth embodiment.

How the relationship between track pitch and the guide groove width of the first substrate 1201 and the guide groove width of the second substrate 1210 affect recording and reproducing characteristics is described next.

First, if the guide groove width on the first and second substrates is 80% or more of the track pitch, the amplitude of the tracking error signal decreases. This causes a tendency for unstable tracking, and playback cannot be evaluated. Therefore, if the guide groove width is within 50% to 80% of the track pitch, appropriate recording and reproducing characteristics can be achieved.

If the thickness of the accumulated thin film layers from the first substrate 1201 to first recording film layer 1204, and from the second substrate 1210 to the second recording film layer 1208, is 0.05 μm or less, narrowing of the groove width will be reduced an amount equivalent to the thickness of the thin film layers built up on the groove edge. It was likewise confirmed that if the thickness from the first substrate 1201 to first recording film layer 1204, and from the second substrate 1210 to the second recording film layer 1208, is 0.05 μm or more, narrowing of the groove width is accordingly greater.

The recording and reproducing characteristics of this optical disc were evaluated using an objective lens with a 0.85 numerical aperture and a read/write head using a 405 nm wavelength laser. A single frequency signal was recorded at a 5 m/sec linear recording velocity. The lands appearing as protrusion when seen from the laser incidence side of the optical disc were used on the first substrate 1201 as the signal recording guide grooves, and the grooves appearing as trenches when seen from the laser incidence side of the optical disc were used on the second substrate 1210 side. It was confirmed that the tracking servo is stable and recording performance is sufficient for a read/write optical disc in both recording layers.

The same effects observed with an optical disc according to the third embodiment were observed when the groove edge angle of the first substrate 1201 and second substrate 1210 was changed. That is, cross erase and crosstalk increase at an edge angle of 75 degrees or more, and an increase in noise is observed at an edge angle of 30 degrees or less. This confirms that appropriate recording and reproducing characteristics can be achieved with an edge angle from 30 degrees to 75 degrees.

When the signal is recorded to and read from the protruding groove of the second substrate, groove noise emanating from the guide groove is high and the carrier noise ratio to the land is low at approximately 10 dB. One reason for noise being high may be that as the width of the trench (land) part of the second substrate increases, the width of the protrusion (groove) between the trenches where the resin must be filled during molding decreases, and pattern transfer is difficult during the molding process. Groove noise may therefore deteriorate as a result of the roughness of the resin surface. Another possible cause for increased groove noise is the roughness of the photoresist surface because the grooves are formed in the photoresist when the photoresist plate is exposed. As with the first substrate, it was also confirmed that when the signal is recorded to and reproduced from the protruding part of the pattern on the first substrate, that is, the land in the protruded part as seen from the laser incidence side of the optical disc, the carrier noise ratio to the groove of the second substrate is low at approximately 10 dB.

Embodiment 5

An optical disc according to this fifth embodiment is has two recording film layers similarly to the optical disc of the fourth embodiment.

Figure 13:
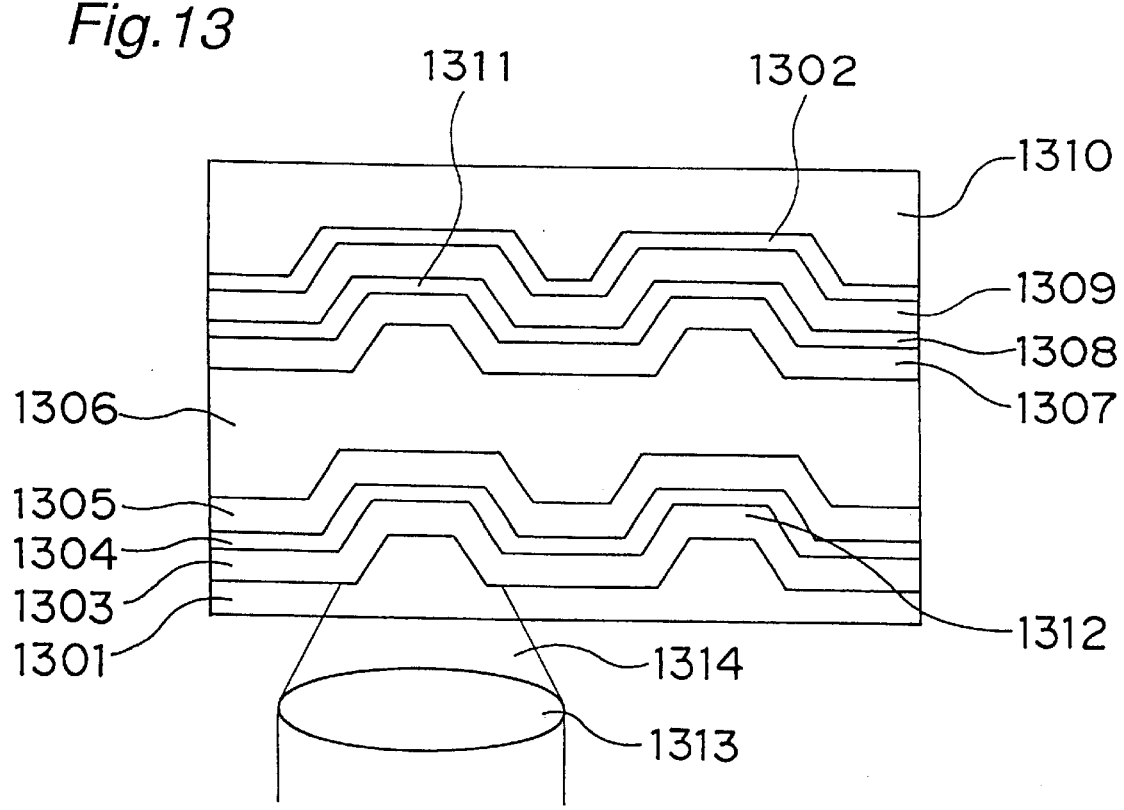
FIG. 13 is a schematic view showing the structure of a multilayer optical disc according to a fifth embodiment of the present invention.

FIG. 13 is a schematic section diagram through the radius of an optical disc according to this fifth embodiment. As shown in FIG. 13, this optical disc has laminated in sequence a transparent layer 1301, dielectric layer 1303, first recording film layer 1304, dielectric layer 1305, intermediate layer 1306, dielectric layer 1307, second recording film layer 1308, dielectric layer 1309, a reflection film 1302, and a substrate 1310. Data is recorded to the first recording film layer 1304, which appears as a trench when seen from the laser incidence side of the optical disc, and to the second recording film layer 1308. The laser beam is reflected by reflection film 1302, becoming read/write beam 1314, which is converged by the objective lens 1313. Land 1311, which is a trench as seen from the laser incidence side, is formed on the substrate 1310. Land 1312, which appears as a trench when seen from the laser incidence side of the optical disc, is formed on the intermediate layer 1306.

This optical disc is manufactured as described below. As described in the third embodiment, a nickel plated stamper formed with the signal recording guide grooves is first made from a photoresist plate recorded with a laser beam recorder. A polycarbonate injection molding is then made using this stamper, resulting in the substrate 1310 having the signal recording guide grooves formed as a land and groove pattern on one side.

An approximately 30 nm thick reflection layer made from an Al alloy, an approximately 20 nm thick SiO2 dielectric layer, an approximately 15 nm thick phase change recording film of Ge, Sb, and Te, and an approximately 50 nm thick dielectric layer of SiO2, are sequentially sputtered onto the land and groove pattern side of the substrate 1310. The thin film layers on the substrate 1310 are then coated with a UV setting resin. A stamper formed with substantially the same signal pattern as the stamper used as the stamper for the substrate is then pressed into the UV setting resin. UV light is then emitted to set the UV setting resin. The stamper is then removed, leaving the land and groove pattern for signal recording transferred to the UV setting resin on the side opposite the substrate 1310.

An approximately 50 nm thick dielectric layer of SiO2, an approximately 15 nm thick phase change recording film of Ge, Sb, and Te, and an approximately 50 nm thick dielectric layer of SiO2 are sequentially sputtered onto this land and groove pattern. An approximately 0.1 mm thick transparent layer is then formed over these thin film layers to complete the optical disc. It will be noted that in this embodiment the recessed trenches (as seen from the laser incidence side of the optical disc) in the substrate 1310 are opposite the recessed trenches in the transparent layer 1301, and the protruding lands between the trenches in the substrate 1310 are opposite the similarly protruding lands in the transparent layer 1301.

A laser with an approximately 250 nm wavelength is used as the light source of the laser beam recorder in this fifth embodiment to record signal recording guide grooves at a 0.32 μm track pitch. In addition, the thin film layer built up on the substrate 1310, the thin film layer built up on the transparent layer 1301, the thickness from the transparent layer 1301 to the first recording film layer 1304, and the thickness from the substrate 1310 to the second recording film layer 1308 are approximately 0.05 μm respectively.

The land width 1311 of the trench on the substrate as seen from the laser incidence side of the disk is recorded to be approximately 60% of the 0.32 μm track pitch at the half value of the pattern edge. As in the third and fourth embodiments, the groove edge angle is approximately 65 degrees where the edge incline is greatest. The land width of the recording film layer after the recording film layer 1308 is formed on the patterned side of the substrate 1310 is narrowed by the thickness of the thin films built up on the pattern edges, and is approximately 46% of the 0.32 μm track pitch.

The width of the grooves of the transparent layer 1301, that is, the part protruding toward the laser incidence side of the optical disc, are recorded to be approximately 60% of the 0.32 μm track pitch at the half value of the pattern edge. The groove edge angle is approximately 65 degrees where the edge incline is greatest. The groove width of the recording film layer after the recording film layer is formed on the patterned side of the transparent layer 1301 is approximately 46% of the 0.32 μm track pitch.

If the thickness from the substrate 1310 to second recording film layer 1308, and from the intermediate layer 1306 to the first recording film layer 1304, is 0.05 μm or less, narrowing of the groove width will be reduced an amount equivalent to the thickness of the thin film layers built up on the groove edge. It was likewise confirmed that if the thickness from the substrate to second recording film layer, and from the intermediate layer to the first recording film layer, is 0.05 μm or more, narrowing of the groove width is accordingly greater.

The recording and reproducing characteristics of this optical disc were evaluated using an objective lens with a 0.85 numerical aperture and a read/write head using a 405 nm wavelength laser. The lands appearing as trenches when seen from the laser incidence side of the optical disc were used on the substrate side as the signal recording guide grooves. The grooves seen as projecting toward the laser incidence side of the optical disc were used on the transparent layer 1301 side. It was confirmed that the tracking servo is stable and recording performance is sufficient for a read/write optical disc in both recording layers.

The same effects observed with an optical disc according to the third embodiment were observed when the groove edge angle of the substrate 1310 and intermediate layer 1306 was changed. That is, cross erase and crosstalk increase at an edge angle of 75 degrees or more, and an increase in noise is observed at an edge angle of 30 degrees or less. This confirms that appropriate recording and reproducing characteristics can be achieved with an edge angle from 30 degrees to 75 degrees.

When the signal is recorded to and read from the protruding groove of the substrate, groove noise emanating from the guide groove is high and the carrier noise ratio to the land is low at approximately 10 dB. One reason for noise being high may be that as the width of the trench (land) part of the substrate increases, the width of the land (groove) between the trenches where the resin must be filled during molding decreases, and pattern transfer is difficult during the molding process. Groove noise may therefore deteriorate as a result of the roughness of the resin surface. Another possible cause for increased groove noise is the roughness of the photoresist surface because the grooves are formed in the photoresist when the photoresist plate is exposed. As with the substrate, it was also confirmed that when the signal is recorded to and reproduced from the protruding parts formed in the intermediate layer opposite the substrate, that is, to the protruding grooves as seen from the laser incidence side of the optical disc, the carrier noise ratio to the land is low at approximately 10 dB. This is likely because the grooves in the land and groove pattern formed by the laser beam recorder are formed by the photoresist, and noise increases as a result of the roughness of the photoresist surface.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical disc comprising:

a plurality of substrate layers each having a plurality of guide grooves;

a plurality of data recording layers laminated on the plurality of substrate layers, each of the plurality of data recording layers having over the guide grooves a recording film for recording data; and an intermediate layer disposed between the plurality of data recording layers;

the guide groove width being different in each of the plurality of substrate layers, and the guide grooves of the data recording layers laminated according to the guide grooves of the substrate layer being the same pitch in each data recording layer.

2. An optical disc as described in claim 1, where the optical disc is irradiated from one side by light for recording and reproducing data, and the groove width of the guide grooves widens according to the depth from the irradiated surface to the substrate layer.

3. An optical disc as described in claim 1, wherein the plurality of data recording layers are two layers.

4. An optical disc as described in claim 1, wherein the recording density is the same in each of the plurality of data recording layers.

5. An optical disc as described in claim 1, wherein a groove width of each of the plurality of guide grooves on the plurality of substrate layers is 0.3 µm or less.

6. An optical disc as described in claim 1, wherein the guide grooves of the recording film in the data recording layer formed by lamination according to the guide grooves of the substrate layer have the same groove width.

7. An optical disc as described in claim 1, where the optical disc is irradiated from one side by light for reproducing data, and the quality of signals reproduced from each of the plurality of data recording layers is the same.

8. An optical disc as described in claim 7, wherein the reproduced signal quality is expressed as jitter.

9. An optical disc as described in claim 7, wherein the reproduced signal quality is expressed as the carrier noise ratio of the reproduced signal.

10. A method for manufacturing an optical disc having a plurality of data recording layers each including a recording film for recording data, comprising:

supplying a plurality of substrates;

coating each of the plurality of substrates with a photosensitive material;

recording a pattern containing guide grooves in each of the plurality of substrates by beam density to record guide grooves so that the recorded guide groove width is different in each of the plural substrates;

developing each of the plural substrates to produce a plurality of master plates having the record pattern;

duplicating a plurality of stampers based on each of the plural masters plates, and producing a plurality of substrate layers on the stampers;

laminating a data recording layer having a recording film on each of the plural substrate layers; and bonding the plural data recording layers together by way of an intervening intermediated layer.

11. A method of manufacturing an optical disc having a plurality of data recording layers each including a recording film for recording data, comprising:

supplying a plurality of substrates;

coating each of the plurality of substrates with a photosensitive material, changing thickness of the photosensitive material on each of the plurality of substrates so that a groove width of each recorded guide groove differs;

recording a pattern containing guide grooves in each of the plurality of substrates;

developing each of the plural substrates to produce a plurality of master plates having the recorded pattern;

duplicating a plurality of stampers based on each of the plurality of master plates, and producing a plurality of substrate layers based on the stampers;

laminating a data recording layer having a recording film on each of the plurality of subdtrate layers; and bonding the plurality of data recording layers together by way of an intervening intermediated layer.

* * * * *